United States Patent
Kim

(10) Patent No.: US 10,419,999 B2
(45) Date of Patent: Sep. 17, 2019

(54) METHOD AND APPARATUS FOR TERMINAL CELL SEARCH IN BEAMFORMING SYSTEM

(71) Applicant: Samsung Electronics Co., Ltd., Gyeonggi-do (KR)

(72) Inventor: Yung-Soo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 15/106,810

(22) PCT Filed: Dec. 19, 2014

(86) PCT No.: PCT/KR2014/012580
§ 371 (c)(1),
(2) Date: Jun. 20, 2016

(87) PCT Pub. No.: WO2015/093892
PCT Pub. Date: Jun. 25, 2015

(65) Prior Publication Data
US 2016/0360463 A1    Dec. 8, 2016

(30) Foreign Application Priority Data

Dec. 20, 2013 (KR) .................. 10-2013-0160521

(51) Int. Cl.
*H04W 36/30* (2009.01)
*H04W 48/16* (2009.01)
(Continued)

(52) U.S. Cl.
CPC .......... *H04W 36/30* (2013.01); *H04B 7/0617* (2013.01); *H04W 48/16* (2013.01);
(Continued)

(58) Field of Classification Search
CPC ....... H04W 48/16; H04W 4/02; H04W 16/28; H04W 72/046; H04W 72/04;
(Continued)

(56) References Cited

U.S. PATENT DOCUMENTS 6,233,466 B1 * 5/2001 Wong .................... H01Q 1/246
370/342
6,694,154 B1  2/2004 Molnar et al.
(Continued)

FOREIGN PATENT DOCUMENTS

KR   10-01136788 B1   4/2012
KR   1001136788 B1    4/2012
(Continued)

OTHER PUBLICATIONS

International Search Report dated Mar. 19, 2015 in connection with International Application No. PCT/KR2014/012580; 5 pages.
(Continued)

*Primary Examiner* — Hardikkumar D Patel

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method of a terminal includes acquiring frame synchronization for a serving base station in a first slot period within a first frame and searching a neighbor cell in a second slot period within a second frame.

14 Claims, 17 Drawing Sheets

(51) Int. Cl.
*H04W 56/00* (2009.01)
*H04B 7/06* (2006.01)
*H04W 72/04* (2009.01)
*H04W 16/28* (2009.01)

(52) U.S. Cl.
CPC ..... *H04W 56/001* (2013.01); *H04W 72/0446* (2013.01); *H04W 16/28* (2013.01)

(58) Field of Classification Search
CPC .............. H04W 72/02; H04W 72/0446; H04W 48/20; H04W 48/12; H04W 56/001; H04W 36/30; H04B 1/7083; H04B 7/0617; H04B 7/0695; H04B 7/022; H04B 7/0684; H04B 7/0456; H04B 7/063; H04B 7/0632; H04B 7/0634; H04B 17/24; H04B 7/0647; H04B 7/0697; H04B 7/0639; H04B 7/10; H04B 7/0408; H04J 11/0069; H01Q 3/24; H01Q 3/40; H01Q 1/246; H04L 25/03; H04L 5/0057
See application file for complete search history.

(56) References Cited

U.S. PATENT DOCUMENTS

| | | | |
|---|---|---|---|
| 6,768,913 | B1 | 7/2004 | Molnar et al. |
| 2009/0253387 | A1* | 10/2009 | Van Rensburg ......... H01Q 3/40 455/90.2 |
| 2009/0296663 | A1 | 12/2009 | Wild |
| 2011/0287787 | A1* | 11/2011 | Nagaraja ............... H04J 11/0069 455/456.3 |
| 2012/0076039 | A1 | 3/2012 | Kwon et al. |
| 2013/0028186 | A1* | 1/2013 | Kim ..................... H04B 7/0617 370/328 |
| 2013/0301455 | A1* | 11/2013 | Jung ................. H04W 72/0406 370/252 |
| 2014/0133472 | A1* | 5/2014 | Su .......................... H04W 48/16 370/336 |
| 2014/0328229 | A1 | 11/2014 | Ahn et al. |
| 2015/0024744 | A1 | 1/2015 | Yi et al. |
| 2015/0373628 | A1* | 12/2015 | Hwang ................. H04W 48/16 370/338 |

FOREIGN PATENT DOCUMENTS

| | | |
|---|---|---|
| WO | WO 2010/137917 A2 | 12/2010 |
| WO | WO 2012/134181 A2 | 10/2012 |
| WO | WO 2013/015636 A2 | 1/2013 |
| WO | WO 2013/094967 A1 | 6/2013 |
| WO | WO 2013/133681 A1 | 9/2013 |

OTHER PUBLICATIONS

Written Opinion of the International Searching Authority dated Mar. 19, 2015 in connection with international Application No. PCT/KR2014/012580; 7 pages.

* cited by examiner

METHOD AND APPARATUS FOR TERMINAL CELL SEARCH IN BEAMFORMING SYSTEM

CROSS-REFERENCE TO RELATED APPLICATION(S) AND CLAIM OF PRIORITY

The present application claims priority under 35 U.S.C. § 365 to International Patent Application No. PCT/KR2014/012580 filed Dec. 19, 2014, entitled "METHOD AND APPARATUS FOR TERMINAL CELL SEARCH IN BEAMFORMING SYSTEM", and, through International Patent Application No. PCT/KR2014/012580, to Korean Patent Application No. 10-2013-0160521 filed Dec. 20, 2013, each of which are incorporated herein by reference into the present disclosure as if fully set forth herein.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The present disclosure relates to a method and an apparatus for searching for a cell of a terminal in a communication system supporting beamforming.

In a cellular communication system supporting beamforming, a terminal and a base station may form a plurality of beams to transmit and receive signals. The terminal and the base station do not form all beams at the same time and form only a single beam or only some beams at a time when communicating using beamforming. In particular, each of the terminal and the base station may select a best beam from among the plurality of beams according to a beamforming protocol, and transmit and receive signals using the selected beam.

It is common that the best beam of the terminal and the base station is changed according to the movement of the terminal, and, when the terminal moves by longer than a threshold distance, the best base station for the terminal may be changed. Accordingly, when the terminal moves, the terminal should search for a best base station and select a best beam for the searched best base station in order to maintain high communication efficiency between the terminal and the base station. The terminal may measure signals received in different directions while changing the directions of reception beams, in order to search for the best base station and the best beam for the base station. However, when the directions of the reception beams are changed to measure the received signals, the terminal cannot communicate with the best base station that the terminal is currently communicating with.

Accordingly, the related-art terminal requests a serving base station to allocate a gap time in order to search for a neighbor base station, and searches for a neighbor base station and measures the intensity of beams of the searched neighbor base station during the gap time allocated by the serving base station. However, the above-described method wastes time during the process in which the terminal requests the serving base station to allocate the gap time and receives a response to the request, and does not allow the terminal to communicate with the serving base station during the gap time. Therefore, there is a problem that reliable communication cannot be guaranteed.

SUMMARY

Accordingly, an exemplary embodiment of the present disclosure provides technology for a terminal to search for a neighbor base station and measure a beam to guarantee reliable communication even when the terminal moves at high speed in a cellular communication system supporting beamforming.

Another exemplary embodiment of the present disclosure provides a method and an apparatus of a terminal which performs a cell search using a synchronization signal and common control information slot within a frame.

Another exemplary embodiment of the present disclosure provides a method and an apparatus of a terminal which acquires synchronization for a serving cell and searches for a neighbor cell using a best reception beam for a serving base station in a 2N-th frame, and searches for a cell while changing a reception beam in sequence in a 2N+1-th frame.

Another exemplary embodiment of the present disclosure provides a method and an apparatus of a base station which sets at least two transmission beam types indicative of different transmission beam orders, and transmits a synchronization signal and common control information in transmission beam orders corresponding to different transmission types in each of sync signal and common control information slot periods in a frame, in order for a terminal to search for a cell.

Another exemplary embodiment of the present disclosure provides a method and an apparatus of a base station which sets at least two transmission beam types indicative of different transmission beam orders, and transmits a beam measurement signal in transmission beam orders corresponding to different base station transmission beam types in each of downlink measurement slot periods within a frame, in order for a terminal to measure beams.

Another exemplary embodiment of the present disclosure provides a method and an apparatus of a terminal which fixes a reception beam in a beam measurement slot period, but changes a reception beam in each beam measurement slot period and measures beams of a serving cell and a neighbor cell.

Another exemplary embodiment of the present disclosure provides a method and an apparatus of a terminal which receives all transmission beam signals corresponding to different base station transmission beam types from a base station by repeating each reception beam at least two times.

Another exemplary embodiment of the present disclosure provides a method and an apparatus of a terminal which sets at least two transmission beam types indicative of different transmission beam orders, and transmits a beam measurement signal in transmission beam orders corresponding to different terminal transmission beam types in each uplink beam measurement slot period within a frame, in order for a base station to measure beams.

Another exemplary embodiment of the present disclosure provides a method and an apparatus of a base station which fixes a reception beam in a beam measurement slot period, but changes a reception beam in sequence in each beam measurement slot period, and measures beams of a terminal belonging to the base station cell and a neighbor cell.

Another exemplary embodiment of the present disclosure provides a method and an apparatus of a base station which receives, from a terminal, all transmission beam signals corresponding to different terminal transmission beam types by repeating each reception beam at least two times.

Another exemplary embodiment of the present disclosure provides a method and an apparatus of a terminal which, when a base station fixes a transmission beam in a downlink beam measurement slot period, but transmits a beam measurement signal while changing a beam in sequence in each beam measurement slot period, receives beam measurement signals in different terminal reception beam orders in each downlink beam measurement slot period within a frame by changing the reception beam in sequence within the beam measurement slot period, but setting at least two different reception beam orders.

Another exemplary embodiment of the present disclosure provides a method and an apparatus in which a serving cell and neighbor cells transmit beam measurement signals by repeating a transmission beam at least two times, and a terminal receives all transmission beam signals from the corresponding cells by using different reception beam types of the terminal.

Another exemplary embodiment of the present disclosure provides a method and an apparatus of a base station which, when a terminal fixes a transmission beam in an uplink beam measurement slot period, but transmits a beam measurement signal while changing a transmission beam in sequence in each beam measurement slot period, receives beam measurement signals in different base station reception beam orders in each uplink beam measurement slot period within a frame by changing the reception beam in sequence within the beam measurement slot period, but setting at least two different reception beam orders.

Another exemplary embodiment of the present disclosure provides a method and an apparatus in which terminals belonging to a cell of a base station and terminals belonging to neighbor cells transmit beam measurement signals by repeating a transmission beam at least two times, and a base station receives all transmission beam signals by using different reception beam types of the base station for each of the transmission beams of the corresponding terminals.

According to an exemplary embodiment of the present disclosure, a method of a base station includes the operations of: transmitting control information in a first transmission beam order in a first slot period within a first frame; and transmitting control information in a second transmission beam order in a first slot period within a second frame.

According to an exemplary embodiment of the present disclosure, an apparatus of a base station includes: a transceiver configured to form a plurality of transmission beams having different directions through an antenna, and transmit and receive signals; and a controller configured to control to transmit control information in a first transmission beam order in a first slot period within a first frame, and transmit control information in a second transmission beam order in a first slot period within a second frame.

According to another exemplary embodiment of the present disclosure, a method of a terminal includes: acquiring frame synchronization for a serving base station in a first slot period within a first frame; and searching for a neighbor cell in a first slot period within a second frame.

According to another exemplary embodiment of the present disclosure, an apparatus of a terminal includes: a transceiver configured to form a plurality of transmission beams having different directions through an antenna, and transmit and receive signals; and a controller configured to control the transceiver to acquire frame synchronization for a serving base station by using a first slot period within a first frame, and search for a neighbor cell by using a first slot period within a second frame.

DETAILED DESCRIPTION

Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure and thus may vary depending on user's or operator's intension and usage. Therefore, the terms used herein must be understood based on the descriptions made herein.

Hereinafter, a method and an apparatus for searching for a cell of a terminal in a communication system supporting beamforming will be explained.

Figure 1:
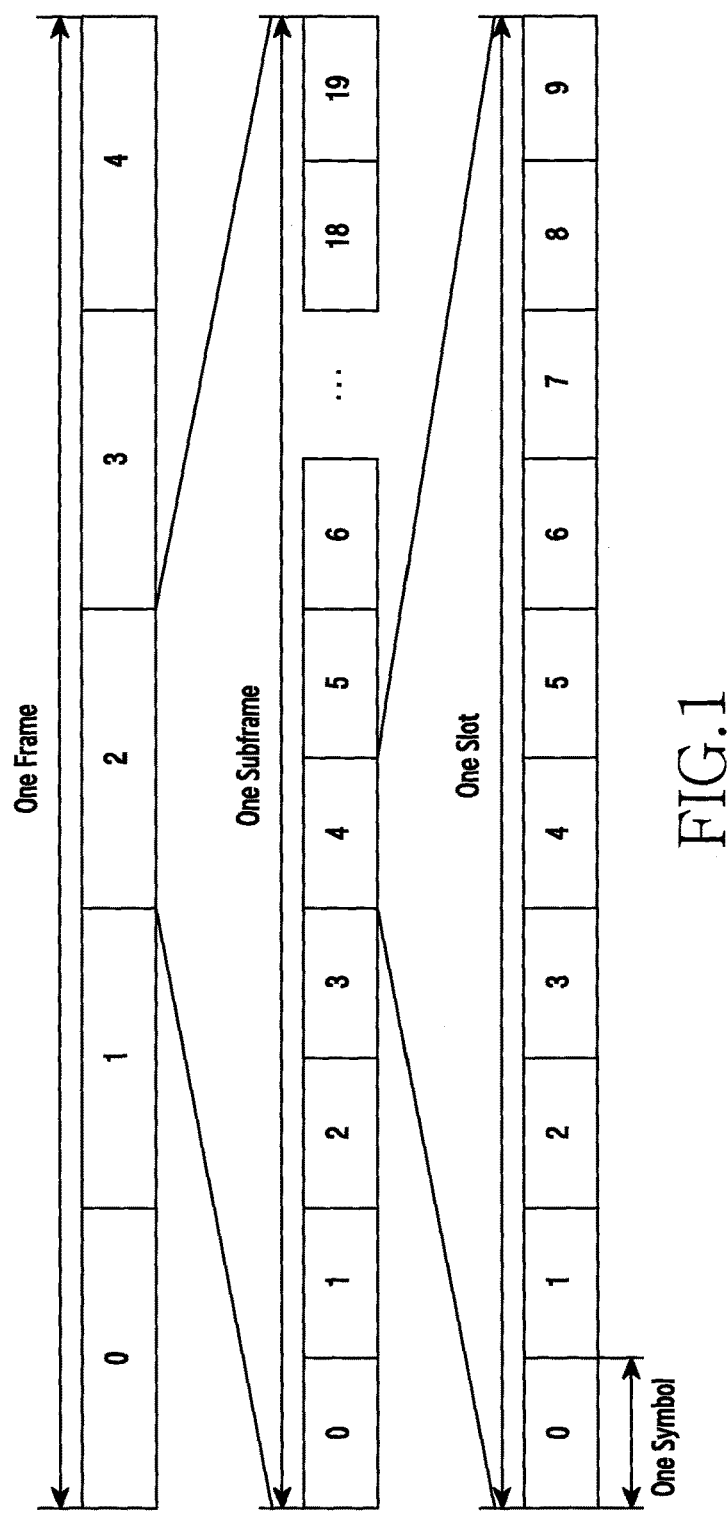
FIG. 1 illustrates a view showing a frame structure in a normal wireless communication system.

FIG. 1 illustrates a view showing a frame structure in a normal wireless communication system.

As shown in FIG. 1, a base station and a terminal may transmit and receive a signal of a frame having a fixed size through beamforming. A single frame is formed of a plurality of subframes each having a fixed length, and a single subframe is formed of a plurality of slots each having a fixed length. A single slot may be formed of a plurality of symbols each having a fixed length. For example, a single frame may be formed of five subframes, a single subframe may be formed of 20 slots, and a single slot may be formed of 10 symbols, as shown in FIG. 1. In this case, the number of symbols forming the slot may be determined according to the length of cyclic prefix (CP) included in the symbol. When a single frame is 5 ms long, a single subframe may be 1 ms long, a single slot may be 50 μs long, and a single symbol may be 5 μs long.

In the above-described frame structure, a downlink frame may be configured by including a synchronization signal (SS) and common control information (for example, a broadcast channel (BCH)) slot, a beam measurement slot, a control slot, and a data slot. Furthermore, an uplink frame may be configured by including a random access channel (RACH) slot, a beam measurement slot, a control slot, and a data slot. In this case, a combination of slots forming a single subframe and the number of slots may be determined by hardware capability of the base station, a deployment environment of the base station, the number of terminals connected to the base station, etc.

The frames according to an exemplary embodiment of the present disclosure may be configured by including at least one synchronization signal and common control information slot and at least one beam measurement slot in every frame.

Figure 2:
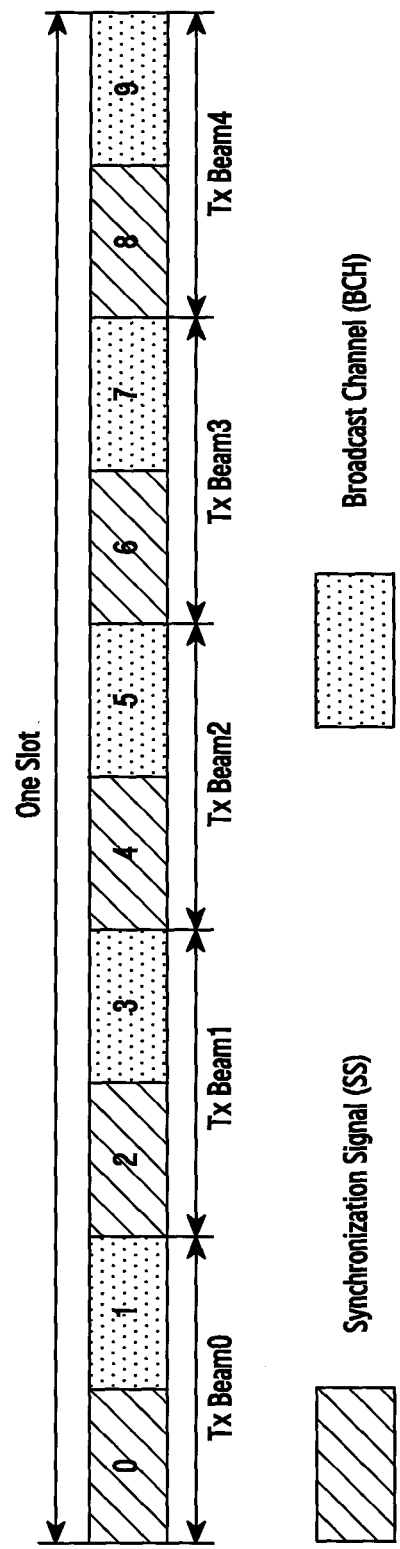
FIG. 2 illustrates a view showing a structure of a synchronization signal and common control information slot in a beamforming system according to an exemplary embodiment of the present disclosure.

FIG. 2 illustrates a view showing a structure of a synchronization signal and common control information slot in a beamforming system according to an exemplary embodiment of the present disclosure.

As shown in FIG. 2, the synchronization signal and common control information slot may be located in a designated area of a frame. Herein, the synchronization signal and common control information slot may be a minimum unit for transmitting a synchronization signal and common control information. A base station may include the synchronization signal and the common control information in the synchronization signal and common control information slot, and transmit the synchronization signal and the common control information repeatedly corresponding to each antenna beam, so that a terminal can receive the synchronization signal and the common control information at any location within a cell of the base station. For example, when the $1^{st}$ slot of the $0^{th}$ subframe is the synchronization signal and common control information slot, the base station may transmit the synchronization signal and the common control information in the $1^{st}$ slot of the $0^{th}$ subframe. In this case, the base station may transmit the synchronization signal and the common control signal to the terminal through the $0^{th}$ symbol and the $1^{st}$ symbol of the $1^{st}$ slot by using the $0^{th}$ transmission beam (Tx Beam 0), transmit the synchronization signal and the common control information to the terminal through the $2^{nd}$ symbol and the $3^{rd}$ symbol by using the $1^{st}$ transmission beam (Tx Beam 1), and transmit the synchronization signal and the common control signal to the terminal through the $4^{th}$ symbol and the $5^{th}$ symbol by using the $2^{nd}$ transmission beam (Tx Beam 2). As a result, the base station may transmit the synchronization signal and the common control information repeatedly five times by using the five transmission beams in a single slot period. When the synchronization signal and the common control information are transmitted repeatedly as described above, the base station may add transmission beam number (or index) information to at least one of the synchronization signal and the common control information, and transmit the synchronization signal and the common control information, in order for the terminal to identify how many synchronization signal and common control information have been transmitted before. In this case, the number of the synchronization signal and common control signal slots within the frame may not be fixed and may be variable. For example, the number of synchronization signal and common control signal slots in the frame may vary according to the number of transmission beams of the base station. For example, when the number of transmission beams of the base station is five, a single slot may be allocated to each frame as the synchronization signal and common control information slot, and, when the number of transmission beams is 10, two slots may be allocated to each frame as the synchronization signal and common control information slots. Herein, when two or more slots are set in one frame to transmit the synchronization signal and the common control information, the corresponding slots may be located continuously and the locations of the corresponding slots may be allocated to fixed locations in each frame. For example, the $1^{st}$ slot and the $2^{nd}$ slot of the $0^{th}$ subframe in each frame may be fixedly allocated as slots for transmitting the synchronization signal and the common control information.

According to an exemplary embodiment of the present disclosure, the terminal may receive the synchronization signal and common control information slot as shown in FIG. 2, and acquire frame synchronization for a serving cell. For example, the terminal may receive a signal in a time period regarding the synchronization signal and common control information slot by using a reception beam, correlate the received signal and a synchronization signal which is generated using a cell number of the serving cell, and determine a time $(k(c;b)_{opt})$ to maximize a metric value which is normalized by using reception power as shown in Equation 1 presented below:

$$k(c;b)_{opt} = \operatorname*{argmax}_{k} |U(c;b)_k|^2 / P(b)_k \qquad \text{Equation 1}$$

$$U(c;b)_k = \sum_{n=0}^{N-1} y(b)_{k+n} s(c)_n^*$$

$$P(b)_k = \sum_{n=0}^{N-1} |y(b)_{k-n}|^2$$

Herein, c refers to a number of a serving cell and $s(c)_k$ refers to a synchronization signal which is generated by using the cell number c. In addition, $y(b)_k$ refers to a signal which is received in a time period regarding the synchronization signal and common control information slot, and $P(b)_k$ refers to reception power of the signal $y(b)_k$. In addition, $|U(c;b)_k|^2/P(b)_k$ refers to a metric value which is a result of normalizing the result of the correlating the received signal and the generated synchronization signal by using the reception power.

The terminal may perform N-point fast Fourier transform (FFT) with respect to a signal sample of $k(c;b)_{opt}+N-1$ at $k(c;b)_{opt}$, and detect a signal of common control information according a predetermined method of receiving the common control information. When the terminal receives the common control information without an error, the terminal may determine how many synchronization signal and common control information have been received before, and recognize a frame start time based on this determination and acquire frame synchronization. The terminal may acquire a frame start time regarding a neighbor cell in the above-described method.

According to an exemplary embodiment of the present disclosure, the terminal may search for a cell, while acquiring synchronization for the serving cell by using the best reception beam for the serving cell in the synchronization signal and common control information slot period. In addition, the terminal may search for a cell to search a neighbor base station, while changing the reception beam in the synchronization signal and common control information slot period. In addition, the terminal may receive a beam measurement signal of the serving cell and a beam measurement signal of a searched neighbor base station, while changing the reception beam in a beam measurement slot. In this case, the terminal may communicate with the serving base station by using the best reception beam in periods other than the synchronization signal and common control information slot period and the beam measurement slot.

Additionally, the base station according to an exemplary embodiment of the present disclosure may set at least two transmission beam types indicative of different transmission beam orders, and transmit the synchronization signal and the common control information in transmission beam orders corresponding to the different transmission beam types in the synchronization signal and common control information slot period in the frame. In the following description, it is assumed that the base station sets two transmission beam types indicative of different transmission beam orders, and transmits the synchronization signal and common control information slot for convenience of explanation. However, two or more transmission beam types may be set according to a design method. For example, the transmission beam types of the base station may be set to a first type and a second type, and the first type and the second type are only indicative of different orders of selected transmission beams, and after all, the same transmission beams are used. In an exemplary embodiment of the present disclosure, the base station may transmit the synchronization signal and the common control information in different transmission beam orders in case the neighbor base station and the serving base station do not synchronize with each other in a real cellular environment, or time taken for the signal of the neighbor base station to arrive at the terminal and time taken for the signal of the serving base station to arrive at the terminal are different from each other. That is, since the frame time period of the neighbor cell and the frame time period of the serving cell do not exactly match each other in an exemplary embodiment of the present disclosure, the terminal may not receive the synchronization signal and the common control information from the neighbor cell in the synchronization signal and common control information slot period within the frame period synchronized for the serving cell. For example, the frame signal of a first neighbor cell may arrive at the terminal earlier than the frame signal of the serving cell, and the frame signal of a second neighbor cell may arrive at the terminal later than the frame signal of the serving cell. However, since the terminal according to an exemplary embodiment of the present disclosure receives signals while changing the reception beams only in the synchronization signal and common control information slot, and receives signals by using the best slot for the serving cell in the other slot periods, the terminal may not receive the synchronization signal and the common control information which are received from the neighbor cell earlier or later. Accordingly, the base station according to the present disclosure sets two different transmission beam types having different transmission beam orders, and transmits the same synchronization signal and common control information two times through the two slots, and the terminal searches for a cell to search for a neighbor base station by receiving the two synchronization signal and common control information slots using a single reception beam.

Figure 3:
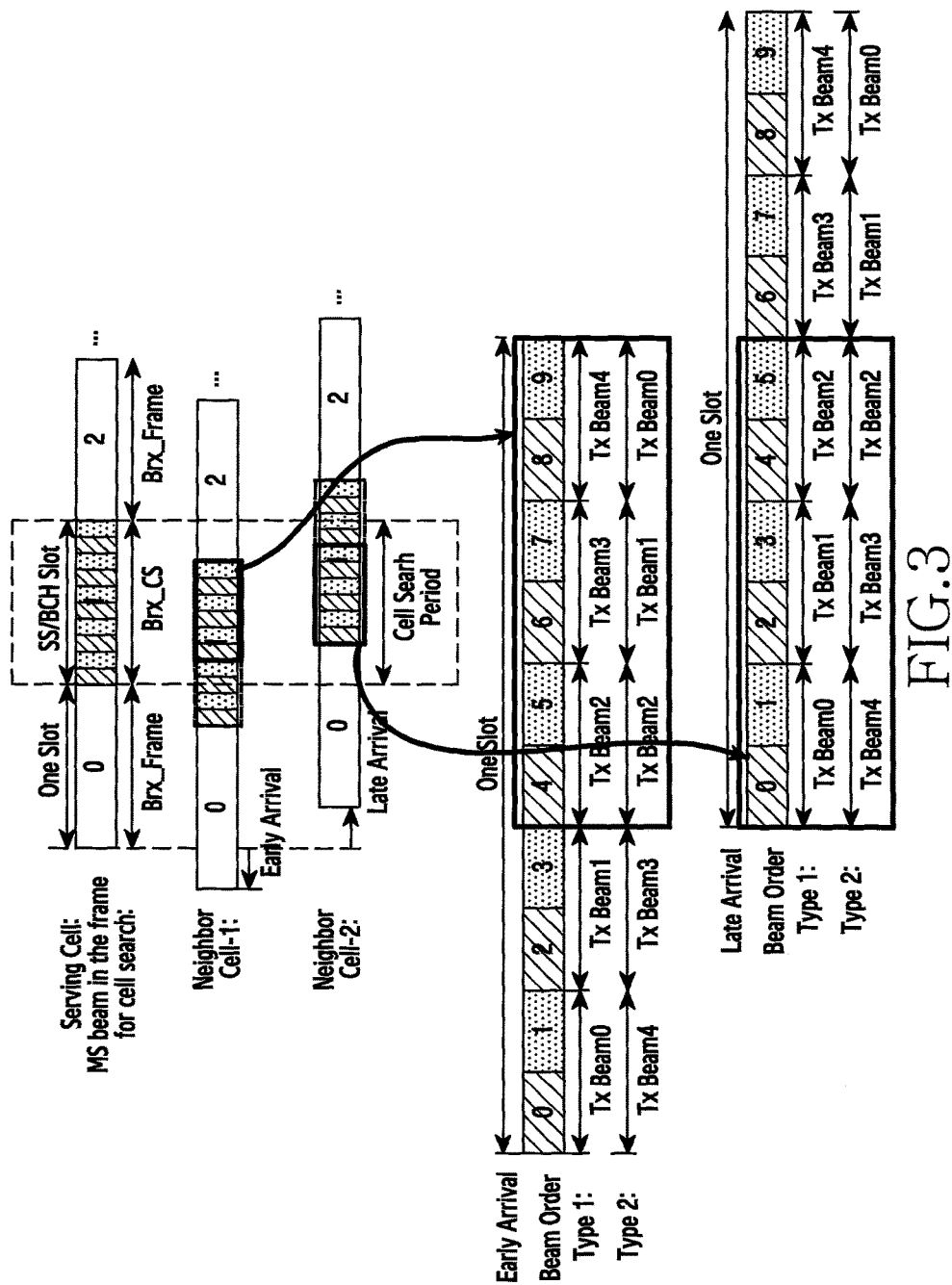
FIG. 3 illustrates a view showing transmission beam orders of a synchronization signal and common control information slot according to an exemplary embodiment of the present disclosure.

FIG. 3 illustrates a view showing transmission beam orders of a synchronization signal and common control information slot according to an exemplary embodiment of the present disclosure.

As shown in FIG. 3, the base station may transmit a synchronization signal and common control information by using transmission beams in order of 0, 1, 2, 3, 4 according to a predetermined first type in the synchronization signal and common control information slot period of a specific frame, and transmit the synchronization signal and the common control information by using transmission beams in order of 4, 3, 2, 1, 0 according to a second type which is the reverser order of the first type in the synchronization signal and common control information slot period of the next frame. In another example, when the order of the transmission beams of the first type is 0, 1, 2, 3, 4, the order of the second type may be 3, 4, 0, 1, 2 or 2, 3, 4, 0, 1. Herein, the first type and the second type having different transmission beam orders may be determined such that the terminal receives signals regarding all transmission beams of a corresponding neighbor base station, which has a frame synchronization error less than or equal to half of one slot period, through the two synchronization signal and common control information slots.

That is, the terminal according to an exemplary embodiment of the present disclosure may receive the synchronization signal and common control information slot period two times through each transmission beam Brx_CS to search for the cell for the neighbor base station. In this case, the reception beam Brx_CS is a reception beam which is used to search for the cell of the neighbor base station, and refers to one of the plurality of reception beams supported by the terminal. For example, the terminal may receive the synchronization signal and the common control information of the first type in the synchronization signal and common control information slot within the specific frame and then may receive the synchronization signal and the common control information of the second type in the synchronization signal and common control information slot within the next frame, by using the specific reception beam Brx_CS to search for the neighbor base station. The terminal may receive signals regarding all of the transmission beams of the base stations by receiving the synchronization signal and common control information slot period two times by using the single reception beam. For example, when the order of the transmission beams of the first type in the neighbor base station using 10 beams is 0, 1, 2, 3, 4, 5, 6, 7, 8, 9, and the order of the transmission beams of the second type is 9, 8, 7, 6, 5, 4, 3, 2, 1, 0 or 5, 6, 7, 8, 9, 0, 1, 2, 3, 4, and when a frame synchronization error regarding the corresponding neighbor base station is less than or equal to five symbols, the terminal may search for the cell of the neighbor base station by receiving two synchronization signal and common control information slot periods through each reception beam.

Additionally, the base station may select the transmission beam order for the synchronization signal and common control information slot, alternately, according to the transmission beam type, in order for the terminal to search a neighbor base station for which the synchronization error exits. For example, the base station may transmit signals in the transmission beam order corresponding to the first type in the synchronization signal and common control information slot periods within the 4n-th and 4n+1-th frames, and transmit signals in the transmission beam order corresponding to the second type in the synchronization signal and common control information slot periods in the 4n+2-th and 4n+3-th frames. In another example, the base station may transmit signals in the transmission beam order corresponding to the first type in the synchronization signal and common control information slot periods within the 4n-th, 4n+1-th, and 4n+2-th frames, and transmit signals in the transmission beam order corresponding to the second type in the synchronization signal and common control information slot periods within the 4n+3-th frame.

Additionally, according to an exemplary embodiment of the present disclosure, the terminal may perform the operation of acquiring synchronization for the serving base station and the operation of searching for the cell for the neighbor base station, alternately. This is because, when the terminal changes the reception beam in the synchronization signal and common control information slot period to search for the neighbor base station, the terminal cannot receive signals of the serving cell and thus cannot synchronize with the frames of the serving cell. Accordingly, according to an exemplary embodiment, the terminal may acquire synchronization for the serving base station by receiving signals using the best reception beam for the serving cell in an even-numbered frame, and may search for the neighbor base station by receiving signals using the changed reception beam in an odd-numbered frame. In this case, the terminal may search for the neighbor base station while acquiring synchronization for the serving base station in the even-numbered frame.

Figure 4:
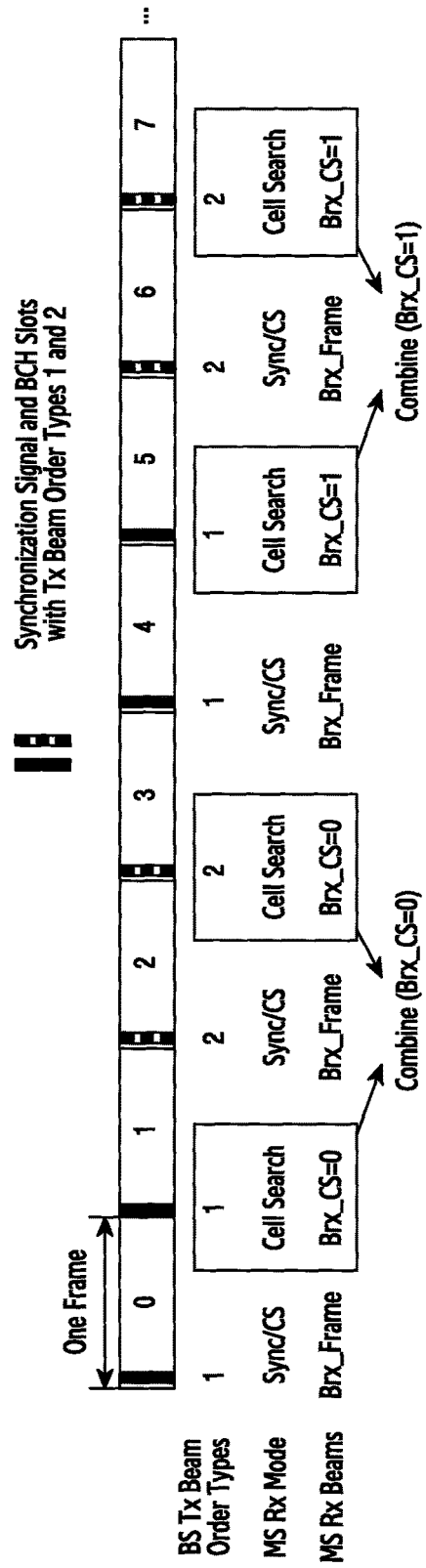
FIG. 4 illustrates a view showing reception beams for searching for a cell of a terminal in a synchronization signal and common control information slot according to an exemplary embodiment of the present disclosure.

FIG. 4 illustrates a view showing reception beams for searching for a cell of a terminal in a synchronization signal and common control information slot according to an exemplary embodiment of the present disclosure.

As shown in FIG. 4, the terminal may acquire synchronization for a serving cell through a best reception beam Brx_Frame, by which the frame of the serving cell is received with the strongest reception signal intensity, in even-numbered frames (for example, $0^{th}$, $2^{nd}$, $4^{th}$, $6^{th}$ frames). In this case, the reception beam Brx_Frame refers to a reception beam by which the terminal can receive a control slot and a data slot of a frame of the serving base station with the strongest reception signal intensity. In addition, the terminal may acquire synchronization for the serving base station through the best reception beam Brx_Frame for the serving cell in the even-numbered frame, and may also search for a neighbor base station.

In addition, the terminal may change the reception beam by increasing the beam number of the reception beam Brx_CS in sequence in odd-numbered frames (for example, $1^{st}$, $3^{rd}$, $5^{th}$, and $7^{th}$ frames), and may set a single reception beam two times continuously and use the same. For example, the terminal may use the reception beam Brx_CS=0 to receive the synchronization signal and common control information slots of the $1^{st}$ frame and the $3^{rd}$ frame which are the odd-numbered frames, and may use the reception beam Brx_CS=1 to receive the synchronization signal and common control information slots of the $5^{th}$ frame and the $7^{th}$ frame which are the odd-numbered frames. As described above, the terminal may receive the signals regarding the synchronization signal and common control information slots of the odd-numbered frames by using the same reception beam Brx_CS two times, and may search for the neighbor base station by considering the signals which have been received two times.

Additionally, the terminal may receive signals while changing the reception beam Brx_CS in the synchronization signal and common control signal slot periods of the odd-numbered frames, but may receive signals by using the reception beam Brx_Frame in the control slot and data slot periods of the odd-numbered frames. In addition, the terminal does not change the reception beam in the synchronization signal and common control information slots of the even-numbered frames and receives signals by using the best reception beam Brx_Frame for the serving base station as it is, and thus can receive all of the transmission beams of the neighbor cell through the Brx_Frame within a single frame. Accordingly, in the case of the even-numbered frame using the fixed Brx_Frame, the terminal does not require signals which have been received two times from the corresponding neighbor base station.

Figure 5:
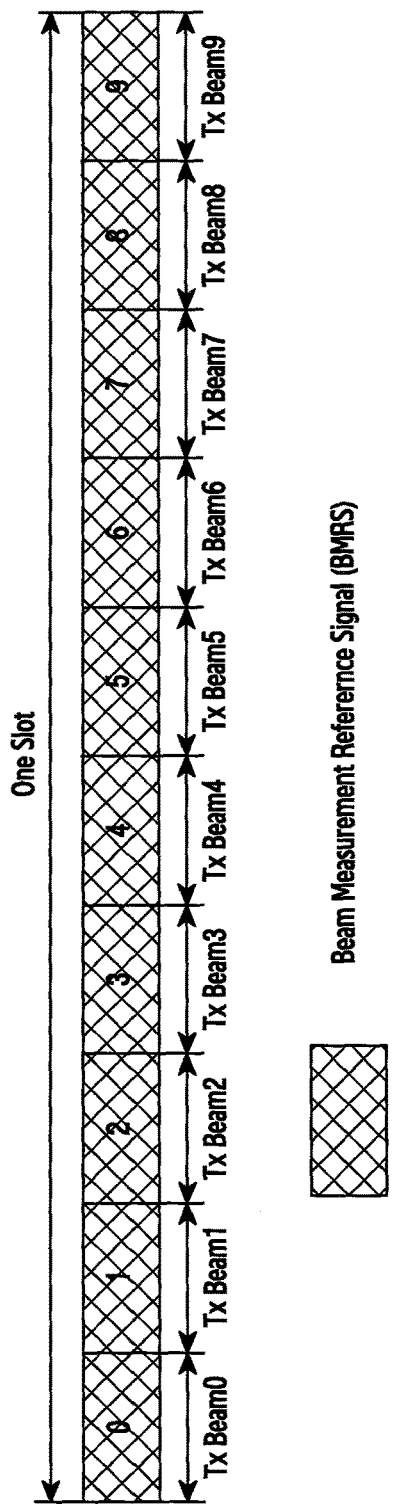
FIG. 5 illustrates a view showing a structure of a downlink beam measurement slot in a beamforming system according to an exemplary embodiment of the present disclosure.

Additionally, in an exemplary embodiment of the present disclosure, a beam measurement slot may be defined as shown in FIG. 5 to measure beams of a serving cell or a cell of a base station which is searched through a cell search. The base station and the terminal measure all transmission and reception beam combinations while changing beams to measure transmission and reception beams of an uplink and a downlink. A method for changing the transmission and reception beams may include the following two methods. The first method is a method of changing a transmission beam swiftly and changing a reception beam slowly. The second method is a method of changing a reception beam swiftly and changing a transmission beam slowly. The first method may be a method in which a transmitter transmits a beam measurement signal while continuously changing a beam in a single beam measurement slot period, but a receiver receives signals by fixing a beam. Herein, the receiver may receive signals by changing to another beam in another beam measurement slot period. The second method may be a method in which a transmitter transmits a beam measurement signal with a fixed beam in a single beam measurement slot period, and a receiver receives signals while continuously changing a beam. Herein, the transmitter may transmit signals by changing to another beam in another beam measurement slot period.

FIGS. 5 to 8 and FIG. 10 relate to a beam measurement method which changes a transmission beam swiftly and changes a reception beam slowly in a beamforming system according to an exemplary embodiment of the present disclosure. In particular, FIG. 5 illustrates a structure of a downlink beam measurement slot for the beam measurement method for changing the transmission beam swiftly and changing the reception beam slowly in the beamforming system according to an exemplary embodiment of the present disclosure. As shown in FIG. 5, the base station transmits, to the terminal, 10 symbols of a beam measurement reference signal (BMRS) for measuring beams through 10 different transmission beams in the downlink beam measurement slot, and thus allows the terminal to measure the 10 transmission beams. In this case, the base station may adjust a transmission beam measurement period by adjusting the number of downlink beam measurement slots allocated to each frame and each subframe. For example, when the base station uses 40 transmission beams and a single slot is allocated in each of four subframes from among five subframes included in one frame as a fixed transmission beam measurement slot, the terminal may measure the transmission beam one time during one frame time. The terminal may receive the beam measurement slot by using the same reception beam until the base station transmits all of the beam measurement signals, one at a time, through the 40 transmission beams. In other words, when the number of transmission beams of the base station is 40 and the number of reception beams of the terminal is 4, and a single slot is used in each subframe as a beam measurement slot, the terminal may require four frames in total to measure all of the transmission beams of the base station and all of the reception beams of the terminal. In another example, when the number of transmission beams of the base station is 20 and two slots are allocated in each subframe as transmission beam measurement slots, the terminal may measure the transmission beam one time during one subframe and thus measure the transmission beam four times in total during one frame time, and the terminal may perform beam measurement with respect to combinations of all transmission beams of the base station and all reception beams of the terminal one time in total. The terminal may receive signals through the best reception beam Brx_Frame for the serving base station in the downlink control slot and data slot periods in each frame, and may receive the beam measurement reference signal through a beam measurement reception beam Brx_BM according to the beam measurement period in the downlink beam measurement slot period in each frame. When the download beam measurement period ends, the terminal may change the reception beam to the best reception beam Brx_Frame and receive a corresponding signal.

According to an exemplary embodiment of the present disclosure, the terminal may perform downlink beam measurement by receiving the beam measurement reference signal in the downlink beam measurement slot period. For example, the terminal may receive the synchronization signal and common control information slot through the reception beam Brx, and detect frame synchronization for the serving base station or the cell of the neighbor base station, and identify time to receive all of the beam measurement reference signals included in the beam measurement slot. The terminal may determine a signal $Y(m;Brx)_n$ of a frequency domain by performing N-point FFT with respect to each beam measurement reference signal $y(m;Brx)_k$ in the beam measurement slot. In this case, m is a number of a beam measurement reference signal in the beam measurement slot, and, when a subframe number and a slot number are allocated, a unique number for a transmission beam of the base station may be determined based on m. Thereafter, equation $Z(m,c;Brx)_n = Y(m;Brx)_n W(C)_n$ may be calculated by multiplying the signal of the frequency domain and a beam measurement reference signal value $W(c)_n$ corresponding to a corresponding cell c, and a time domain signal $z(m,c;Brx)_k$ may be calculated by performing N-point IFFT with respect to $Z(m,c;Brx)_n$ and then power may be measured using the calculated time domain signal. A beam measurement value may be calculated_by using a maximum power value $Q_{peak}(m,c;Brx)$ or a sum $Q_{T_{BM}}(m, c; Brx)$ of power values which are greater than a threshold value $T_{BM}$. Herein, $Q_{peak}(m,c;Brx)$ and $Q_{T_{BM}}(m, c; Brx)$ may be calculated by using Equation 2 presented below:

$$Q_{peak}(m, c; Brx) = \qquad \text{Equation 2}$$
$$\max_k\{|z(m, c; Brx)_k|^2 \mid k = 0, 1, \ldots, N-1\}$$
$$Q_{T_{BM}}(m, c; Brx) =$$
$$\text{sum}\{|z(m, c; Brx)_k|^2 \mid |z(m, c; Brx)_k|^2 > T_{BM},$$
$$k = 0, 1, \ldots, N-1\}$$
$$z(m, c; Brx)_k = IFFT\{Z(m, c; Brx)_n\}$$
$$Z(m, c; Brx)_n = Y(m; Brx)_n W(c)_n$$

Herein, when the beam measurement reference signal value $W(c)_n$ corresponding to the cell c is designed to be perpendicular to that of another cell in the frequency domain, that is, when a condition $W(c1)_n * W(c2)_n = 0$ is always satisfied for different cells c1 and c2 with respect to all frequency indexes n, a sum of power of reception signals $Z(m,c;Brx)_n$ in the frequency domain may be calculated without calculating the time domain signal $z(m,c;Brx)_k$, and may be used as a beam measurement value.

Additionally, the base station according to an exemplary embodiment of the present disclosure may transmit a reference signal for measuring beams in transmission beam orders corresponding to different transmission beam types in the downlink beam measurement slot period in the frame, in order for the terminal to perform the downlink beam measurement. For example, the transmission beam types of the base station may be set to a first type and a second type, and the first type and the second type are only indicative of different orders of selected transmission beams, and after all, the same transmission beams are used. In an exemplary embodiment of the present disclosure, the base station may transmit the beam measurement reference signal in different transmission beam orders in case the neighbor base station and the serving base station do not synchronize with each other in a real cellular environment, or time taken for the signal of the neighbor base station to arrive at the terminal and time taken for the signal of the serving base station to arrive at the terminal are different from each other.

That is, since the frame time period of the neighbor cell and the frame time period of the serving cell do not exactly match each other in an exemplary embodiment of the present disclosure, the terminal may not receive the beam measurement reference signal from the neighbor cell in the beam measurement period synchronized for the serving cell. For example, the frame signal of a first neighbor cell may arrive at the terminal earlier than the frame signal of the serving cell, and the frame signal of a second neighbor cell may arrive at the terminal later than the frame signal of the serving cell. However, since the terminal according to an exemplary embodiment of the present disclosure receives signals while changing the reception beams only in the synchronization signal and common control information slot and the beam measurement slot, and receives signals by using the best slot for the serving cell in the other slot periods, the terminal may not receive the beam measurement reference signal which are received from the neighbor cell earlier or later. Accordingly, the base station according to the present disclosure sets two different transmission beam types having different transmission beam orders, and transmits the same beam measurement reference signal two times through the two slots, and the terminal may perform beam measurement with respect to transmission beams of the neighbor base station by receiving the two beam measurement slots using a single reception beam.

Figure 6:
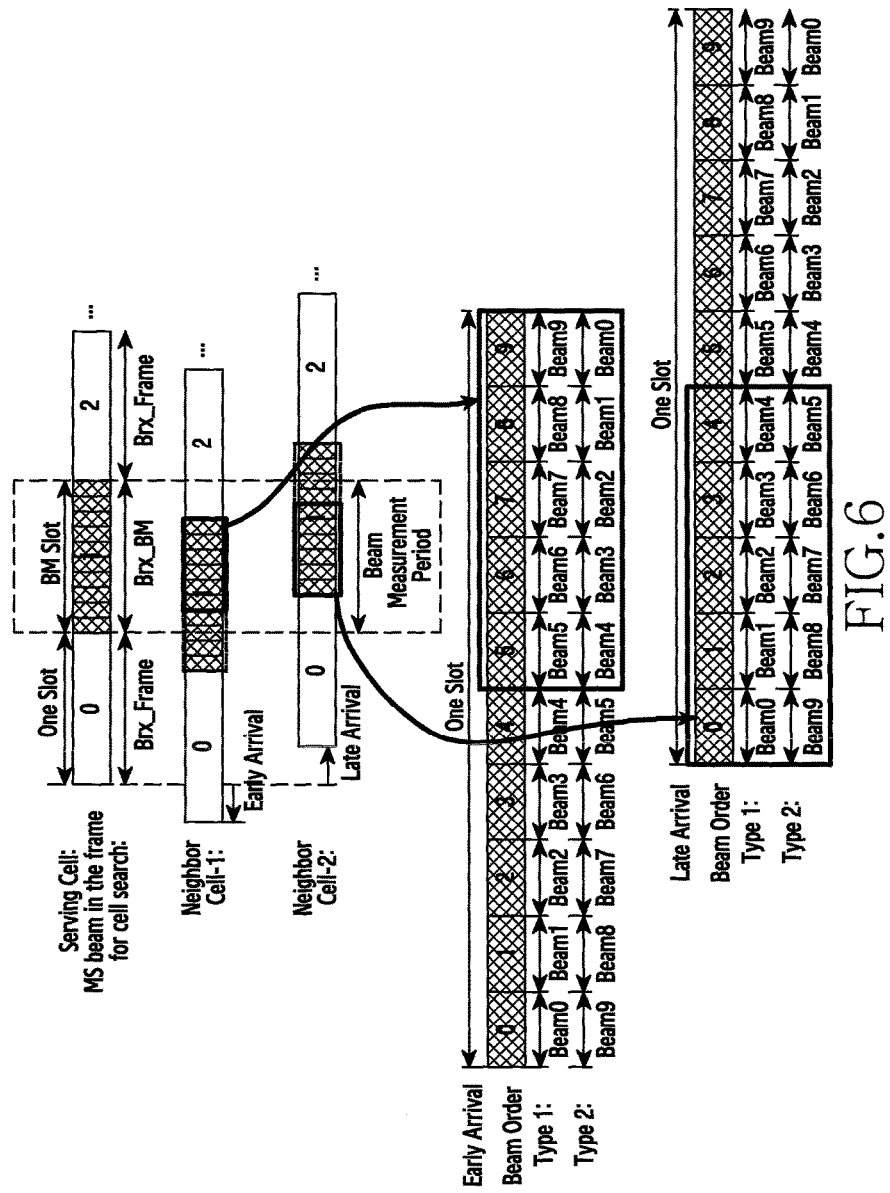
FIG. 6 illustrates a view showing transmission beam orders of a beam measurement slot for a beam measurement method which changes a transmission beam swiftly and changes a reception beam slowly according to an exemplary embodiment of the present disclosure.

FIG. 6 illustrates a view showing transmission beam orders of a beam measurement slot for the beam measurement method which changes the transmission beam swiftly and changes the reception beam slowly according to an exemplary embodiment of the present disclosure.

As shown in FIG. 6, the base station may transmit a beam measurement reference signal by using transmission beams in order of 0, 1, 2, 3, 4, 5, 6, 7, 8, 9 according to a predetermined first type in a downlink beam measurement slot period of a specific frame, and transmit a beam measurement reference signal by using transmission beams in order of 9, 8, 7, 6, 5, 4, 3, 2, 1, 0 according to a predetermined second type, which is the reverse order of the first type, in a beam measurement slot period of the next frame. In another example, when the order of transmission beams of the first type is 0, 1, 2, 3, 4, 5, 6, 7, 8, 9, the second type may be the reversed order of one half and the other of the first type like 5, 6, 7, 8, 9, 0, 1, 2, 3, 4. Herein, the first type and the second type having different transmission beam orders may be determined such that the terminal receives signals regarding all transmission beams of the corresponding neighbor base station, which has a frame synchronization error less than or equal to half of one slot period, through the two beam measurement slots.

According to an exemplary embodiment of the present disclosure, the base station may transmit the beam measurement reference signal in the transmission beam order of the first type during one period in which transmission beams are transmitted one at a time in the downlink beam measurement slot period, and transmit the beam measurement reference signal in the transmission beam order of the second type during the next period. In this case, when the terminal measures beams of the serving base station, there is no loss in signals due to synchronization mismatch because the frames are synchronized with the serving cell. Therefore, the terminal may receive the beam measurement reference signal only during one period in which transmission beams are transmitted one at a time. On the other hand, when the terminal measures beams of the neighbor base station, the frames are not synchronized with the neighbor cell and thus the terminal may receive signals during two periods in which transmission beams are repeated two times for each reception beam. For example, as shown in FIG. 6, when the signal of the beam measurement slot of the neighbor base station arrives earlier or later than the beam measurement slot reception period of the terminal, and a difference therebetween is within five symbols, the terminal may receive the beam measurement reference signals regarding all of the transmission beams of the neighbor base station through each reception beam, by receiving the beam measurement slot through which the neighbor base station transmits the beam measurement reference signal in the transmission beam order of the first type, and the beam measurement slot through which the neighbor base station transmits the beam measurement reference signal in the transmission beam order of the second type, by using each reception beam.

In another example, when the number transmission beams used by the base station is 20, the base station may transmit the beam measurement reference signal through each of the 20 transmission beams using two beam measurement slots. The first type indicative of the transmission beam order may be 0, 1, 2, . . . , 19, and the second type may be 19, 18, 17, . . . , 2, 1, 0 or 10, 11, 12, . . . , 19, 0, 1, 2, . . . , 8, 9. When the frame synchronization error of the neighbor base station is less than or equal to 10 symbols, the terminal may measure all of the transmission beams of the neighbor base station by receiving two periods in which the transmission beams of the neighbor base station are transmitted one at a time, that is, four slots. For example, as shown in FIGS. 7A to 7C, the terminal may receive all of the signals in the beam measurement slot periods of the first type and the second type through the reception beams, and then obtain measurement values regarding the transmission beams of the corresponding neighbor base station.

Figure 7A:
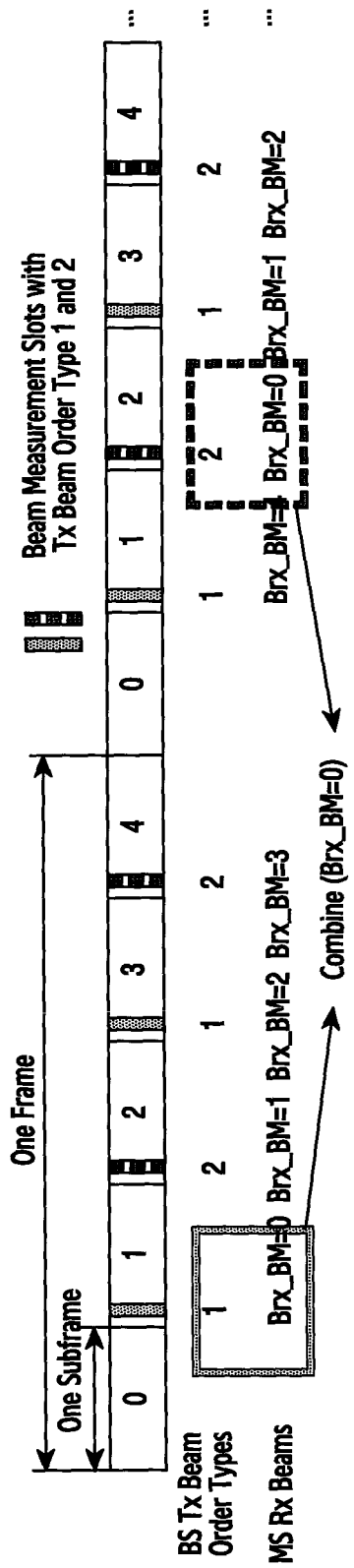
FIGS. 7A to 7C illustrate views showing examples of transmission beam orders in which a base station transmits a reference signal for beam measurement in a downlink beam measurement slot, and examples of reception beams in a terminal when the beam measurement method of changing the transmission beam swiftly and changing the reception beam slowly is used according to an exemplary embodiment of the present disclosure.
Figure 7B:
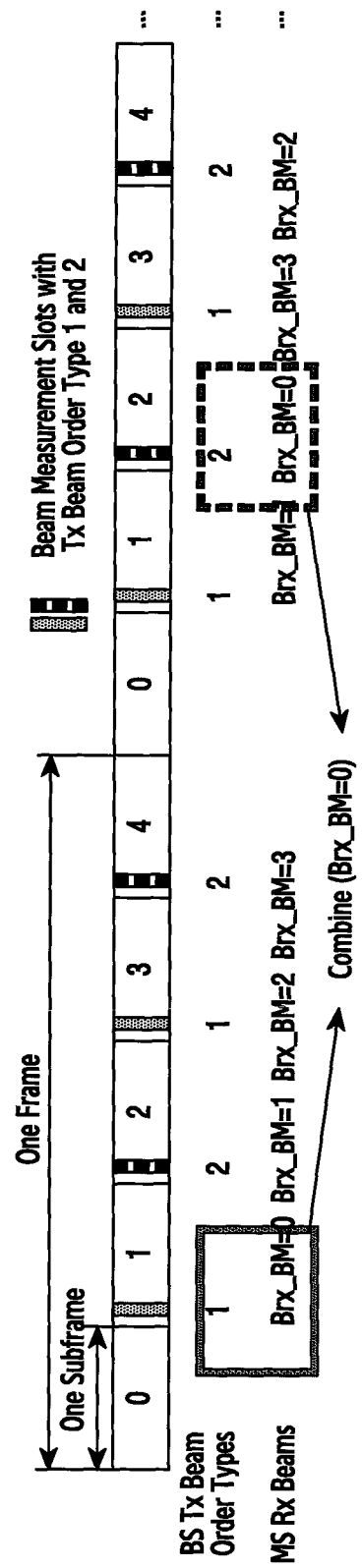
Figure 7C:
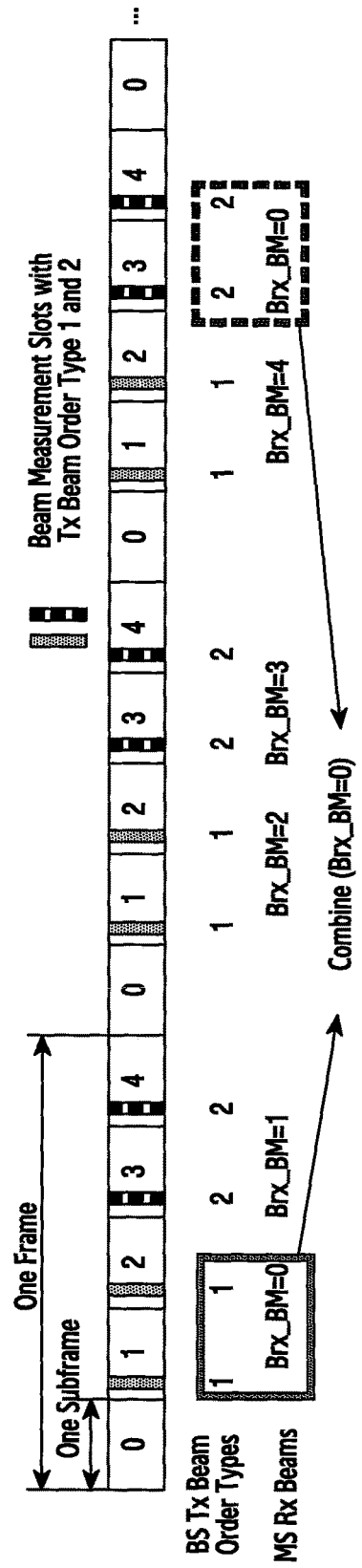

FIGS. 7A to 7C illustrate views showing examples of transmission beam orders in which the base station transmits a reference signal for beam measurement in the downlink beam measurement slot, and examples of reception beams in the terminal when the beam measurement method of changing the transmission beam swiftly and changing the reception beam slowly is used according to an exemplary embodiment of the present disclosure.

FIG. 7A illustrates a case in which one slot is set in each of the four subframes from among the five subframes included in one frame as a beam measurement slot, and the base station uses 10 transmission beams and the terminal uses 5 reception beams. In this case, the base station may transmit beam measurement reference signals regarding all of the transmission beams, one at a time, through the beam measurement slot included in one subframe. Accordingly, the terminal may receive the beam measurement reference signal transmitted in the first type in the beam measurement slot period of subframe number 1 in the first frame by using the reception beam Brx_BM=0, and receive the beam measurement reference signal transmitted in the second type in the beam measurement slot period of subframe number 2 in the second frame by using the reception beam Brx_BM=0.

In addition, the terminal may receive the beam measurement reference signal transmitted in the first type in the beam measurement slot period of subframe number 2 in the first frame by using the reception beam Brx_BM=1, and receive the beam measurement reference signal transmitted in the second type in the beam measurement slot period of subframe number 3 in the second frame by using the reception beam Brx_BM=1. The terminal may measure the transmission beams of the corresponding neighbor base station by combining the signals of different types which are received through the beam measurement slot periods in the two subframes in each of the reception beams.

FIG. 7B illustrates a case in which two slots are set in each of the four subframes from among the five subframes included in one frame as beam measurement slots, and the base station uses 20 transmission beams and the terminal uses 4 reception beams. In this case, the base station may transmit beam measurement reference signals regarding all of the transmission beams, one at a time, through the beam measurement slots included in one subframe. Accordingly, the terminal may receive the beam measurement reference signal transmitted in the first type in the two beam measurement slot periods of subframe number 1 in the first frame by using the reception beam Brx_BM=0, and receive the beam measurement reference signal transmitted in the second type in the two beam measurement slot periods of subframe number 2 in the second frame by using the reception beam Brx_BM=0. In addition, the terminal may receive the beam measurement reference signal transmitted in the second type in the two beam measurement slot periods of subframe number 2 in the first frame by using the reception beam Brx_BM=1, and receive the beam measurement reference signal transmitted in the first type in the two beam measurement slot periods of subframe number 1 in the second frame by using the reception beam Brx_BM=1. The terminal may measure the transmission beams of the corresponding neighbor base station by combining the signals of different types which are received through the beam measurement slot periods in the two subframes in each of the reception beams.

FIG. 7C illustrates a case in which two slots are set in each of the four subframes from among the five subframes included in one frame as beam measurement slots, and the base station uses 40 transmission beams and the terminal uses 5 reception beams. In this case, the base station may transmit beam measurement reference signals regarding all of the transmission beams, one at a time, through the beam measurement slots included in two subframes, that is, the four beam measurement slots. Accordingly, the terminal may receive the beam measurement reference signal transmitted in the first type in the beam measurement slot period of subframe number 1 and the beam measurement slot period of subframe number 2 in the first frame by using the reception beam BrxBM=0, and receive the beam measurement reference signal transmitted in the second type in the beam measurement slot period of subframe number 3 and the beam measurement slot period of subframe number 4 in the third frame by using the reception beam Brx_BM=0. The terminal may measure the transmission beams of the corresponding neighbor base station by combining the signals of different types which are received through the beam measurement slot periods in the four subframes in each of the reception beams.

As described above, the terminal receives the beam measurement slot period repeatedly in each reception beam. Accordingly, when each of the transmission beam signals of the neighbor base station is received through the first type and the second type without at least any one loss, the terminal may obtain a beam measurement value with reference to the signals which are received without loss.

Additionally, when the terminal receives the signals for all of the transmission beams of the neighbor base station through the first type and the second type without loss, the terminal may calculate a beam measurement value with reference to the most recently received signal, or may calculate a beam measurement value for each of the transmission beams by which the signals are received through the first type and the second type, and then calculate a beam measurement value by multiplying each of the measurement values with a weight value.

Figure 8:
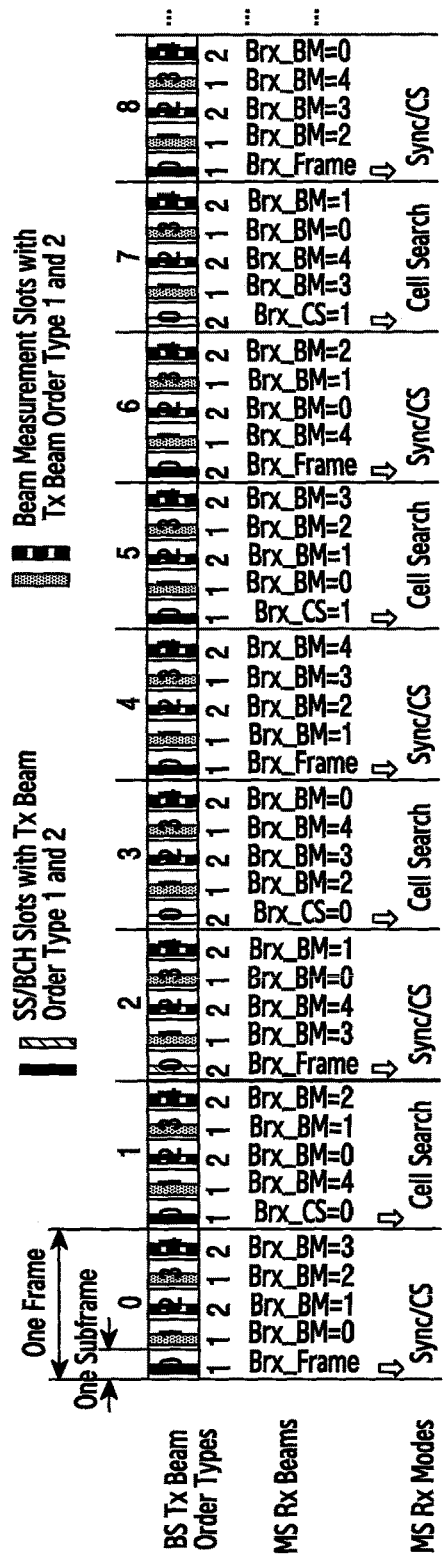
FIG. 8 illustrates a view showing an example of a structure of a frame which is used in communication between a base station and a terminal, and an example of performing a cell search and beam measurement in the frame structure according to an exemplary embodiment of the present disclosure.

FIG. 8 illustrates a view showing an example of a structure of a frame which is used in communication between a base station and a terminal, and an example of performing a cell search and beam measurement in the frame structure according to an exemplary embodiment of the present disclosure.

Referring to FIG. 8, the base station may transmit a synchronization signal and common control information slot in the $0^{th}$ subframe of each frame, and transmit beam measurement slots in the first to fourth subframes in each frame. The base station may set the transmission beam order of the synchronization signal and common control information slot two times continuously according to each type. For example, the base station may set the transmission beam order of the synchronization signal and common control information slot to be repeated two times in order of Type 1, Type 1, Type 2, Type 2, Type 1, Type 1, Type 2, Type 2 in the $0^{th}$ subframes of the $0^{th}$ frame to N-th frame. Furthermore, the base station may select the transmission beam order for the beam measurement slot periods of the first to fourth subframes in each frame as the first type and the second type, alternately, in each subframe. For example, the transmission beam order for the beam measurement slot periods of the first subframe to the fourth subframe may be set to Type 1, Type 2, Type 1, Type 2.

Figure 9:
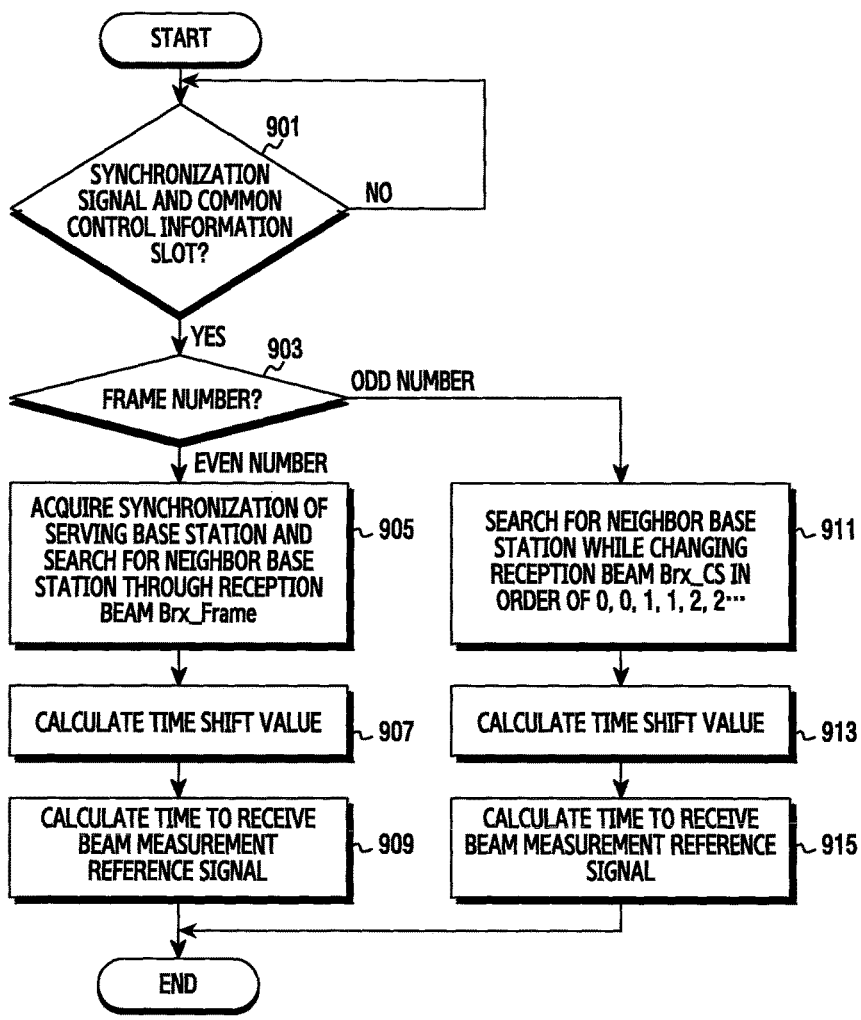
FIG. 9 illustrates a view showing a procedure for receiving a synchronization signal and common control information slot in a terminal according to an exemplary embodiment of the present disclosure.

FIG. 9 illustrates a view showing a procedure for receiving a synchronization signal and common control information slot in a terminal according to an exemplary embodiment of the present disclosure.

Referring to FIG. 9, the terminal determines whether an identified slot period is a synchronization signal and common control information slot period or not in operation 901. When the identified slot period is not the synchronization signal and common control information slot period, the terminal may perform operation 901 again.

On the other hand, when the identified slot period is the synchronization signal and common control information slot period, the terminal proceeds to operation 903 to determine whether an identified frame number is an even number or an odd number.

When the identified frame number is an even number, the terminal proceeds to operation 905 to acquire synchronization for a serving base station and search for a neighbor base station through a reception beam Brx_Frame. In other words, the terminal may acquire synchronization for the serving base station and search for the neighbor base station through the best reception beam Brx_Frame for the serving base station.

Thereafter, the terminal proceeds to operation 907 to calculate a time shift value. For example, the terminal may identify a cell number c of the base station receiving common control information through Brx_Frame without error, acquire frame synchronization for the serving base station based on Equation 1, and determine a frame synchronization time of the searched neighbor base station and/or a time shift (TS) value (c;Brx_Frame) between the frame of the searched neighbor base station and the frame of the serving base station.

Thereafter, the terminal proceeds to operation 909 to calculate time to receive a beam measurement reference signal. In other words, the terminal may calculate the time TBMRS (bmrs,c;Brx_Frame) to receive the beam measurement reference signal (BMRS) of the base station c through the reception beam Brx_Frame.

Thereafter, the terminal may end the procedure according to the exemplary embodiment of the present disclosure.

When the frame number identified in operation 903 is an odd number, the terminal proceeds to operation 911 to search for a neighbor base station while changing the reception beam Brx_CS in order of 0, 0, 1, 1, 2, 2, . . . . In other words, in the middle of transmitting and receiving a control signal or a data signal for the serving base station through Brx_Frame before a synchronization signal and common control information slot reception period, the terminal may change the reception beam to Brx_CS when the synchronization signal and common control information slot period arrives, and try to receive a synchronization signal and common control information of the neighbor base station. In this case, the terminal may search for the neighbor base station while changing the reception beam index of Brx_CS in order of 0, 0, 1, 1, 2, 2, . . . in each of the synchronization signal and common control information slot periods as shown in FIGS. 3 and 4.

Thereafter, the terminal proceeds to operation 913 to calculate a time shift value. Specifically, the terminal may identify a cell number c of the neighbor base station receiving common control information through each reception beam Brx_CS without an error, and determine a frame synchronization time of the corresponding base station and/or a time shift (TS) value (c;Brx_CS) with the frame of the serving base station based on Equation 1.

Thereafter, the terminal proceeds to operation 915 to calculate time to receive a beam measurement reference signal. In other words, the terminal may calculate the time TBMRS (bmrs,c;Brx_CS) to receive the beam measurement reference signal (BMRS) of the neighbor base station c through the reception beam Brx_CS.

Thereafter, the terminal may end the procedure according to the exemplary embodiment of the present disclosure.

Figure 10:
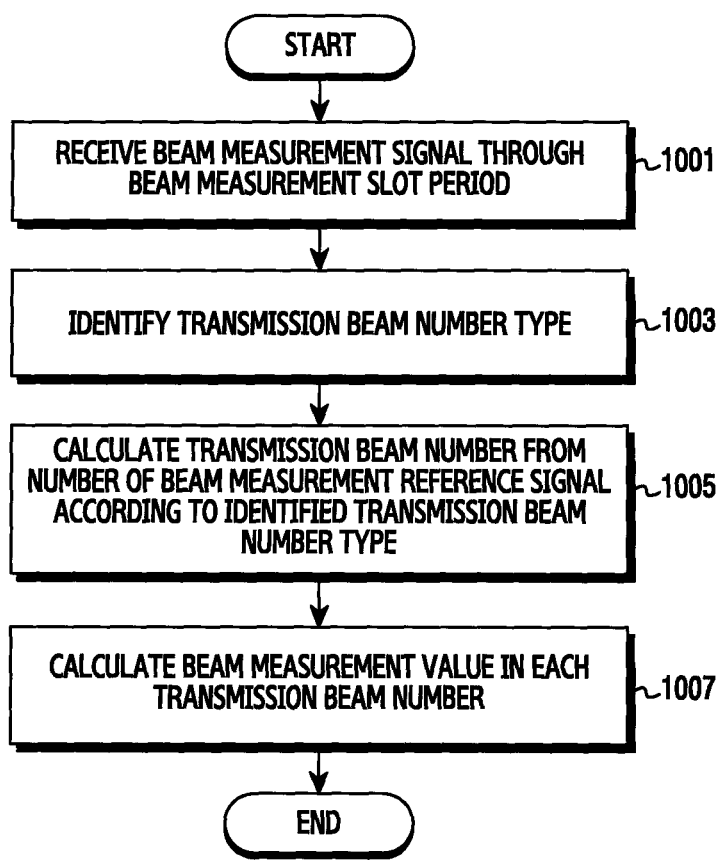
FIG. 10 illustrates a view showing a procedure in which the terminal receives a downlink beam measurement slot by the beam measurement method of changing the transmission

FIG. 10 illustrates a view showing a procedure in which the terminal receives a downlink beam measurement slot by the beam measurement method of changing the transmission beam swiftly and changing the reception beam slowly in the beamforming system according to an exemplary embodiment of the present disclosure.

Referring to FIG. 10, the terminal may receive a beam measurement signal through a beam measurement slot period in operation 1001. For example, the terminal may receive the beam measurement reference signal by changing a reception beam to Brx_BM in downlink beam measurement slot periods included in the $1^{st}$ to $4^{th}$ subframes except for the $0^{th}$ subframe in each of the frames. In this case, the terminal may receive the beam measurement reference signal using the beam measurement reference signal reception time calculated in FIG. 9.

Thereafter, the terminal may identify a transmission beam type indicative of an order of transmission beams in operation 1003. In this case, the terminal may identify the transmission beam type which is used by the base station through the number of the subframe for the beam measurement slot. Herein, the transmission beam type may be at least one of a first type and a second type having different transmission beam orders. For example, the second type may be the reverse order of the first type.

Thereafter, the terminal proceeds to operation 1005 to calculate a transmission beam number from the number of the beam measurement reference signal based on the transmission beam type of the corresponding beam measurement slot period. That is, the terminal may calculate the transmission beam number from the number bmrs of the beam measurement reference signal according to the type of the transmission beam. Herein, the number of the beam measurement reference signal may indicate how many beam measurement reference signals have been transmitted from the base station in the corresponding beam measurement slot periods before the corresponding beam measurement reference signal. For example, when the type of the transmission beams is the first type, the terminal may calculate the transmission beam number Btx according to equation Btx=bmrs, and, when the type of the transmission beams is the second type, the transmission beam number Btx may be calculated according to equation Btx=$N_{brms}$-1-bmrs. In this case, bmrs may be 0, 1, . . . , $N_{bmrs}$-1.

Thereafter, the terminal proceeds to operation 1007 to calculate a beam measurement value for each of the transmission beam numbers. For example, the terminal may identify a beam measurement reference signal reception time TBMRS (bmrs c;Brx_BM) regarding a base station c for each of the reception beams Brx_BM, and determine whether the bmrs-th beam measurement reference signal which is transmitted through the transmission beam Btx of the base station c is received without loss. When the bmrs-th beam measurement reference signal is received without loss, a beam measurement value Q (brms,c;Brx_BM) may be calculated. In this case, the terminal may use $Q_{peak}$ (bmrs, c;Brx_BM) and $Q_{T_{BM}}$(bmrs,c;Brx_BM) shown in Equation 2 described above as the beam measurement value Q. The terminal may determine whether the beam measurement reference signal regarding the transmission beam Btx of the base station c falls out of the beam measurement slot period or whether loss occurs or not based on the beam measurement reference signal reception time TBMRS (bmrs c;Brx_BM), and, when it is determined that the beam measurement reference signal falls out of the beam measurement slot period or loss occurs, the terminal does not calculate the beam measurement value regarding the transmission beam Btx of the base station c and may use a beam measurement value regarding a transmission beam Btx which has been acquired in the previous beam type which is different from the current base station transmission beam type.

Thereafter, the terminal may end the procedure according to the exemplary embodiment of the present disclosure.

Figure 11:
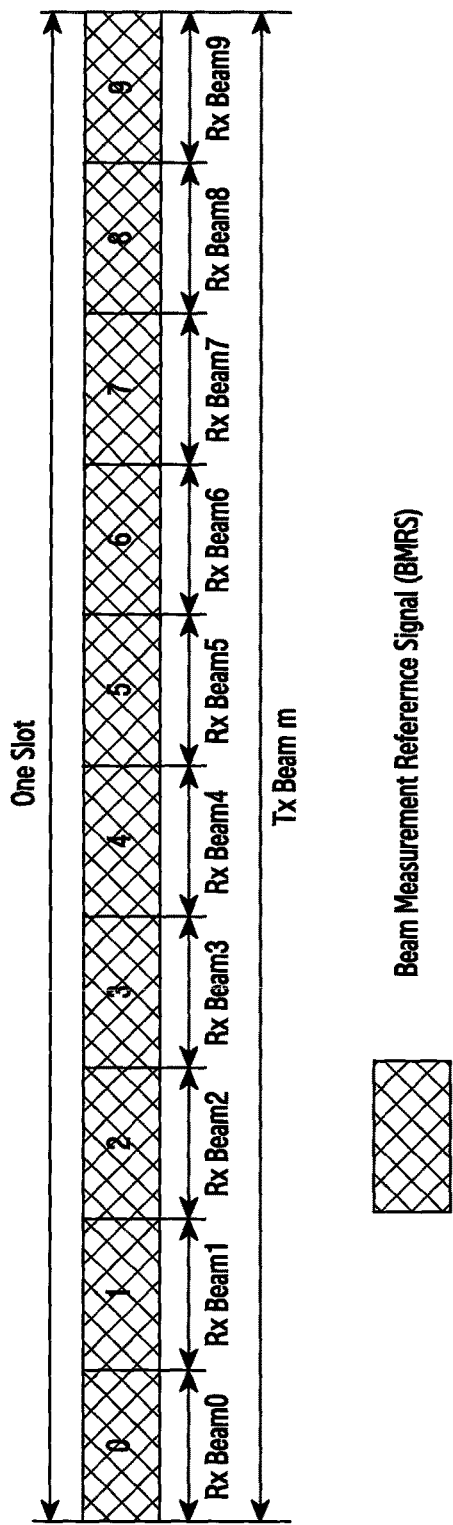
FIG. 11 illustrates a view showing a structure of an uplink beam measurement slot of a method which changes a reception beam swiftly and changes a transmission beam slowly in a beamforming system according to an exemplary embodiment of the present disclosure.
Figure 12:
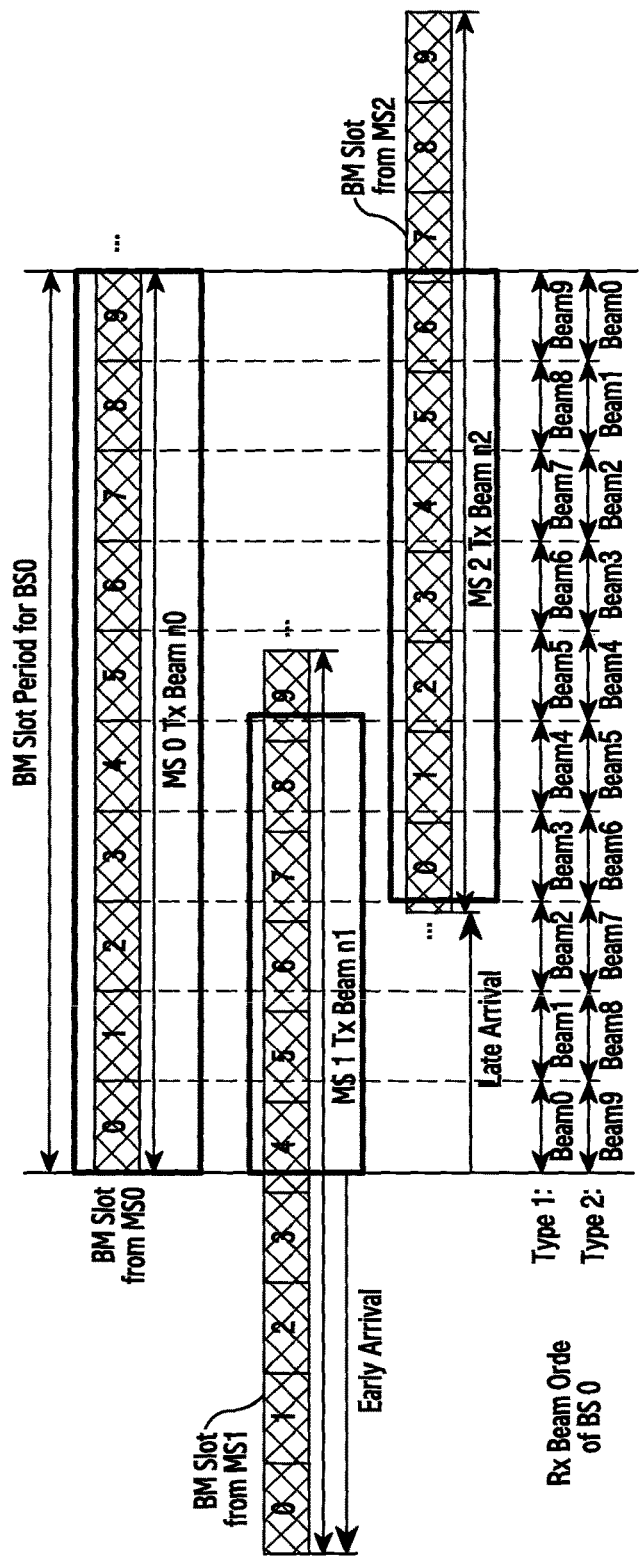
FIG. 12 illustrates a view showing examples of reception beam orders of an uplink beam measurement slot for the beam measurement method which changes the reception beam swiftly and changes the transmission beam slowly according to an exemplary embodiment of the present disclosure.
Figure 13:
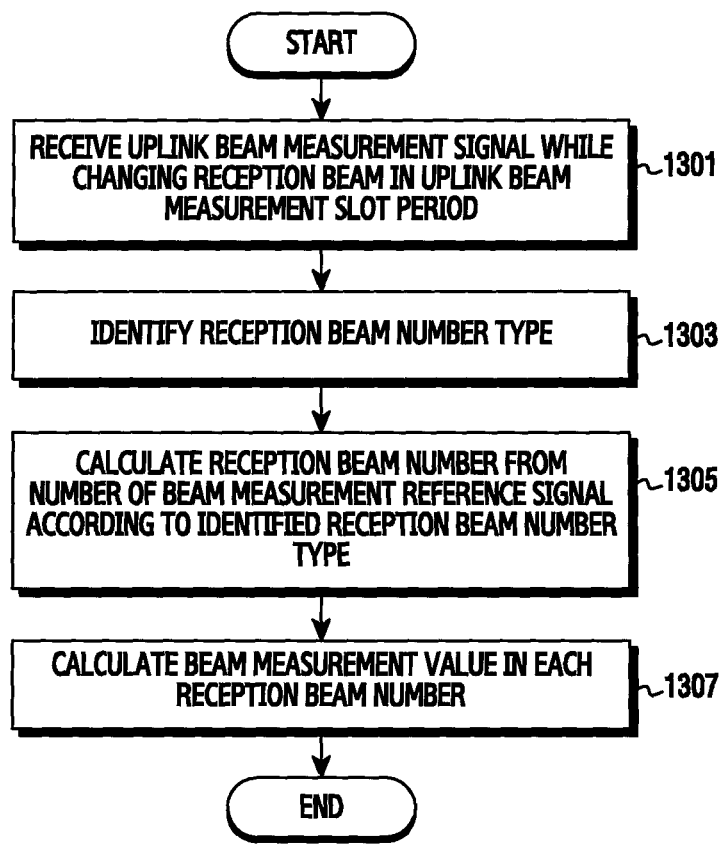
FIG. 13 illustrates a view showing a procedure of a base station for receiving an uplink beam measurement slot in a beamforming system according to an exemplary embodiment of the present disclosure.

FIGS. 11 to 13 relate to a beam measurement method which changes a reception beam swiftly and changes a transmission beam slowly in a beamforming system according to an exemplary embodiment of the present disclosure. In particular, FIG. 11 illustrates a structure of an uplink beam measurement slot for the beam measurement method for changing the reception beam swiftly and changing the reception beam slowly in the beamforming system according to an exemplary embodiment of the present disclosure.

As shown in FIG. 11, the terminal transmits, to the base station, 10 symbols of a beam measurement reference signal for measuring beams through the same transmission beam in the uplink beam measurement slot, and thus allows the base station to measure the 10 reception beams. In this case, the base station may adjust a reception beam measurement period by adjusting the number of uplink beam measurement slots allocated to each frame and each subframe. For example, when the base station uses 40 reception beams and a single slot is allocated in each of four subframes from among five subframes included in one frame as a fixed reception beam measurement slot, the base station may measure the transmission beam one time during one frame time. The terminal may transmit the beam measurement slot by using the same reception beam until the base station receives all of the beam measurement signals, one at a time, through the 40 reception beams. In other words, when the number of reception beams of the base station is 40 and the number of transmission beams of the terminal is 4, and a single slot is used in each subframe as a beam measurement slot, the terminal may require four frames in total to measure all of the reception beams of the base station and all of the transmission beams of the terminal. In another example, when the number of reception beams of the base station is 20 and two slots are allocated in each subframe as reception beam measurement slots, the base station may measure the reception beam one time during one subframe and thus measure the reception beam four times in total during one frame time. The terminal may transmit signals through the best transmission beam Btx_Frame for the serving cell in the uplink control slot and data slot periods in each frame, and, when the uplink beam measurement slot period ends, may change the transmission beam to the best transmission beam Btx_Frame and transmit a corresponding signal.

According to an exemplary embodiment of the present disclosure, the base station may perform uplink beam measurement by receiving the beam measurement reference signal in the uplink beam measurement slot period. For example, the base station may receive the uplink beam measurement slot signal transmitted by the terminal u using the transmission beam Btx, and determine a signal $Y(Btx; m)_n$ of a frequency domain by performing N-point FFT with respect to the m-th beam measurement reference signal $y(Btx;m)_k$ in the beam measurement slot. Thereafter, equation $Z(Bmu;m)_n = Y(Btx;m)_n W(u)_n$ may be calculated by multiplying the signal of the frequency domain and a beam measurement reference signal value $W(u)_n$ corresponding to the corresponding terminal u, and a time domain signal $z(Btx,u;m)_k$ may be calculated by performing N-point IFFT with respect to $Z(Btx,u;m)_n$ and then power may be measured using the calculated time domain signal. A beam measurement value may be calculated by using a maximum power value $Q_{peak}(Btx,u;m)$ or a sum $Q_{T_{BM}}(Btx, u; m)$ of power values which are greater than a threshold value $T_{BM}$. Herein, $Q_{peak}(Btx,u;m)$ and $Q_{T_{BM}}(Btx, u; m)$ may be calculated by using Equation 3 presented below:

$$Q_{peak}(Btx, u; m) = \max_k\{|z(Btx, u; m)_k|^2 \mid k = 0, 1, \ldots, N-1\}$$

$$Q_{T_{BM}}(Btx, u; m) = \text{sum}\{|z(Btx, u; m)_k|^2 \mid |z(Btx, u; m)_k|^2 > T_{BM},$$

$$k = 0, 1, \ldots, N-1\}$$

$$z(Btx, u; m)_k = IFFT\{Z(Btx, u; m)_n\}$$

$$Z(Btx, u; m)_n = Y(Btx; m)_n W(u)_n$$

Equation 3

Herein, when the beam measurement reference signal value $W(u)_n$ corresponding to the terminal u is designed to be perpendicular to that of another terminal in the frequency domain, that is, when a condition $W(u1)_n^* W(u2)_n = 0$ is always satisfied for different terminal u1 and u2 with respect to all frequency indexes n, a sum of power of reception signals $Z(Btx,u;m)_n$ in the frequency domain may be calculated without calculating the time domain signal $z(Btx,u;m)_k$, and may be used as a beam measurement value.

In the cellular communication, the terminals transmit RACH signals to synchronize uplink frames with the base station. The base station receives the RACH signals transmitted from the terminals, estimates an uplink frame synchronization error of each terminal, and transmits a Time Advance value for compensating for the uplink frame synchronization error to each terminal. Thereafter, each of the terminals adjusts an uplink transmission time as much as the Time Advance value and transmits the signals. Therefore, the signals of the plurality of terminals arrive according to the uplink frame time of the base station. However, when the terminal synchronizes the uplink frame time with its serving base station in this method, the terminal cannot synchronize the uplink frame with the neighbor base station at the same time. This is because the neighbor base station and the base station do not synchronize frames with each other or the time taken for the signal transmitted by the terminal to arrive at the serving base station and the time taken for the signal to arrive at the neighbor base station are different from each other. Accordingly, the uplink signals of the terminals belonging to each base station can arrive in synchronization with the base station, but the uplink signals of terminals belonging to the neighbor base station are highly likely to arrive asynchronously. Furthermore, in uplink beam measurement in which a plurality of terminals transmit beam measurement slots and a base station receives the beam measurement slots and measures beams, a similar phenomenon to that of the downlink beam measurement occurs. Accordingly, the beam measurement slots transmitted by the terminals belonging to the base station can arrive with synchronized uplink frames, but, the beam measurement slots transmitted by the terminals belonging to the neighbor base station may arrive with asynchronous uplink frames. Therefore, the embodiments of the present disclosure can apply the methods used in the downlink beam measurement to the uplink beam measurement. The exemplary embodiments of the present disclosure assume that each base station receives RACH signal from not only the terminals belonging thereto but also the terminals belonging to the neighbor base station to measure uplink beams, and knows uplink frame synchronization error values Time Advance of the corresponding terminals. In the exemplary embodiments of the present disclosure, it is assumed that the uplink frame synchronization error Time_Advance [u] which is acquired by the base station receiving RACH signals from the terminal u has a negative value when the uplink frame synchronization error Time_Advance [u] is earlier than an uplink frame reference time of the base station, and has a positive value when the uplink frame synchronization error Time_Advance [u] is later than the reference time.

The base station according to an exemplary embodiment of the present disclosure may receive a reference signal for measuring beams in reception beam orders corresponding to different reception beam types in the uplink beam measurement slot period in the frame, in order to perform the uplink beam measurement. For example, the reception beam types of the base station may be set to a first type and a second type, and the first type and the second type are only indicative of different orders of selected reception beams, and after all, the same reception beams are used. In an exemplary embodiment of the present disclosure, the base station may receive the beam measurement reference signal in different reception beam orders in case the frames of the neighbor base station and the base station do not synchronize with each other in a real cellular environment, or time taken for the signals of the terminals belonging to the neighbor base station to arrive at the base station and time taken for the signals of the terminals regarding the base station as the serving base station to arrive at the base station are different from each other.

That is, since the uplink frame time periods of the terminals belonging to the neighbor cell and the uplink frame time periods of the terminals belonging to the base station do not exactly match each other in an exemplary embodiment of the present disclosure, the base station may not receive the beam measurement reference signal from the terminals belonging to the neighbor cell. For example, the uplink beam measurement slot of a first terminal may arrive at the base station earlier than the uplink beam measurement slot period of the cell, and the uplink beam slot of a second terminal may arrive at the base station later than the uplink beam slot of the cell. However, since the base station according to an exemplary embodiment of the present disclosure measures the uplink beams only in the beam measurement slot with reference to its own uplink frame time, and receives other signals in the other slot periods, the base station may not measure beams from the beam measurement reference signal which arrives earlier or later. Accordingly, the base station according to the present disclosure sets two different reception beam types having different reception beam orders, and receives the same beam measurement reference signal two times through the two slots, and the terminal may perform beam measurement with respect to terminals which do not have uplink frames synchronized by transmitting the two beam measurement slots using a single transmission beam.

FIG. 12 illustrates a view showing examples of reception beam orders of an uplink beam measurement slot for the beam measurement method which changes the reception beam swiftly and changes the transmission beam slowly according to an exemplary embodiment of the present disclosure.

As shown in FIG. 12, the base station may receive a beam measurement reference signal by using reception beams in order of 0, 1, 2, 3, 4, 5, 6, 7, 8, 9 according to a predetermined first type in an uplink beam measurement slot period of a specific frame, and receive a beam measurement reference signal by using reception beams in order of 9, 8, 7, 6, 5, 4, 3, 2, 1, 0 according to a predetermined second type, which is the reverse order of the first type, in a beam measurement slot period of the next frame. In another example, when the order of reception beams of the first type is 0, 1, 2, 3, 4, 5, 6, 7, 8, 9, the second type may be the reversed order of one half and the other of the first type like 5, 6, 7, 8, 9, 0, 1, 2, 3, 4. Herein, the first type and the second type having different reception beam orders may be determined such that the base station receives signals regarding transmission beams of the corresponding terminal, which has a synchronization error of the uplink beam measurement slot less than or equal to half of one slot period, by using all of the reception beams of the base station through the two beam measurement slots.

According to an exemplary embodiment of the present disclosure, the base station may receive the beam measurement reference signal in the reception beam order of the first type during one period in which reception beams are received one at a time in the uplink beam measurement slot period, and receive the beam measurement reference signal in the reception beam order of the second type during the next period. In this case, when the base station measures beams of the terminal belonging thereto, there is no loss in signals due to synchronization mismatch because the uplink frames of the terminal are synchronized with the corresponding base station. Therefore, the base station may receive all of the beam measurement reference signals during one period in which reception beams are received one at a time. On the other hand, when the base station measures beams of a terminal belonging to the neighbor base station, the uplink frames are not synchronized with the base station and thus the base station may receive signals during two periods in which base station reception beams are repeated two times for each terminal transmission beam. For example, as shown in FIG. 12, a terminal MS0 belonging to a cell 0 or a base station 0 does not generate loss of signals since uplink frames are synchronized. However, when a signal of a beam measurement slot of a terminal MS1 belonging to the neighbor base station arrives earlier than an uplink beam measurement slot reception period of the base station, the early signal is not used for the reception beam measurement, and the base station may measure reception beams by using a signal which arrives within the uplink beam measurement slot period. In FIG. 12, with respect to a terminal MS1, the base station may measure reception beams of beams 0, 1, 2, 3, 4 in the reception beam order of the first type, and measure reception beams of beams 9, 8, 7, 6, 5 in the reception beam order of the second type. As a result, the base station may measure all of the reception beams of the base station in response to the transmission beams of the terminal MS1 through two beam measuring operations. In FIG. 12, the beam measurement slot signal of the other terminal MS2 arrives later than the uplink beam measurement slot reception period of the base station. In this case, the base station may measure reception beams 3, 4, 5, 6, 7, 8, 9 in the reception beam order of the first type, and may measure reception beams 6, 5, 4, 3, 2, 1, 0 in the reception beam order of the second type.

In the same principle as in the downlink beam measurement method explained above with reference to FIGS. 7A to 7C, the uplink beams may be measured by selecting terminal transmission beams and base station reception beams in the uplink beam measurement slots. To apply FIGS. 7A to 7C to the uplink beam measurement, MS Rx beam and Brx_BM are changed to MS Tx beam and Btx_BM.

FIG. 13 illustrates a view showing a procedure in which the base station receives an uplink beam measurement slot by the beam measurement method of changing the reception beam swiftly and changing the transmission beam slowly in the beamforming system according to an exemplary embodiment of the present disclosure.

Referring to FIG. 13, the base station may receive a beam measurement signal while changing a base station reception beam during a beam measurement slot period in operation 1301. For example, the terminal may receive the beam measurement reference signal by changing a reception beam to Brx_BM in uplink beam measurement slot periods included in the $1^{st}$ to $4^{th}$ subframes except for the $0^{th}$ subframe in each of the frames. In the downlink beam measurement, the beam measurement reference signal reception time TBMRS may be changed according to the cell or the base station c and the transmission beam Btx, whereas, in the uplink beam measurement, the beam measurement reference signal reception time is not changed according to the terminal and the transmission beam, and may be changed only by a base station reception beam measurement reference signal number bmrs or reception beam number Brx_BM.

Thereafter, the base station may identify a reception beam type indicative of an order of reception beams in operation 1303. In this case, the base station may identify the transmission beam type which is used by the base station through the number of the subframe for the beam measurement slot. Herein, the reception beam type may be at least one of a first type and a second type having different reception beam orders. For example, the second type may be the reverse order of the first type.

Thereafter, the base station proceeds to operation 1305 to calculate a reception beam number from the number of the beam measurement reference signal based on the reception beam type of the corresponding beam measurement slot period. That is, the base station may calculate the reception beam number from the number bmrs of the beam measurement reference signal according to the type of the reception beam. For example, when the type of the reception beams is the first type, the base station may calculate the reception beam number Brx according to equation Brx=bmrs, and, when the type of the reception beams is the second type, the reception beam number Brx may be calculated according to equation Brx=$N_{brms}$−1−1 bmrs. In this case, bmrs may be 0, 1, . . . , $N_{bmrs}$−1.

Thereafter, the base station may calculate a beam measurement value for each of the reception beam numbers in operation 1307. In this case, since all of the uplink beam measurement reference signals transmitted by a terminal belonging to the base station arrive in the uplink beam measurement slot period of the base station without loss, the base station may obtain measurement values for all of the reception beams of the base station. However, when the uplink beam measurement slot signal transmitted by the terminal u arrives earlier than the uplink frame reference time of the base station, and an uplink frame synchronization error value Time_Advance [u] of the terminal is a negative number, the base station may obtain a beam measurement value only for an uplink beam measurement reference signal which is received without loss between TIME_ULBM_START (uplink beam measurement slot start time) and TIME_ULBM_END (uplink beam measurement slot end point)+Time_Advance [u], and may not obtain a beam measurement value for a signal which causes loss. In this case, the base station may use $Q_{peak}$(Btx,u;bmrs) and $Q_{T_{BM}}$(Btx,u;bmrs)$Q_{T_{BM}}$(Btx,u;bmrs) which are shown in Equation 3 described above based on the beam measurement value Q. Referring to FIG. 12, the signal of the terminal MS1 may arrive earlier than the reference time of the base station. In another example, when the uplink beam measurement slot signal transmitted by the terminal u arrives later than the uplink frame reference time of the base station and the uplink frame synchronization error value Time_Advance [u] of the terminal is a positive number, the base station may obtain a beam measurement value only for an uplink beam measurement reference signal which is received without loss between TIME_ULBM_START+Time_Advance [u] and TIME_ULBM_END time, and may not obtain a beam measurement value for a signal which causes loss. Referring to FIG. 12, the signal of the terminal MS2 may arrive later than the reference time of the base station.

Thereafter, the base station may end the procedure according to the exemplary embodiment of the present disclosure.

The present disclosure for the downlink beam measurement and the uplink beam measurement described above may equally be applied to uplink beam measurement and downlink beam measurement when the base station and the terminal reverse their roles.

Therefore, the downlink beam measurement method and operation of the present disclosure described above with reference to FIGS. 5 to 8 and FIG. 10 may equally be applied to downlink beam measurement which changes a transmission beam swiftly and changing a reception beam slowly when the base station and the terminal reverse their roles. That is, FIG. 5 may equally be applied to a case in which the terminal transmits signals while changing the transmission beam in sequence in each of the uplink beam measurement slot periods, and the base station receives signals by using a fixed reception beam in each of the uplink beam measurement slot periods, but changes to another reception beam in another beam measurement slot period and receives signals to measure uplink beams. FIG. 6 may equally be applied to a case in which the terminals change transmission beams in the uplink beam measurement slot period, but select the transmission beam order as the type 1 or type 2 and transmit signals, and the base station selects the reception beam Brx_BM and receives signals. In this case, the base station may measure the uplink beams by receiving signals transmitted by terminals belonging to neighbor base stations as well as signals transmitted by the terminal belonging to the base station. FIGS. 7A, 7B, and 7C may equally be applied to uplink beam measurement in which the terminal changes transmission beams in the uplink beam measurement slot period and transmits signals while changing the transmission beam order to the type 1 to type 2, and the base station selects the reception beam Brx_BM and receives signals. FIG. 8 may equally be applied to uplink beam measurement in which the terminal changes transmission beams in the uplink beam measurement slot period and transmits signals by changing the transmission beam order to the type 1 to type 2, and the base station selects the reception beam Brx_BM and receives signals. However, there is a difference in that the terminal in the uplink does not transmit the synchronization signal and common control information slot to the base station, and the base station does not search for a cell. However, there is no problem in explaining the uplink beam measurement operation of the present disclosure. FIG. 10 may equally be applied to the uplink beam measurement operation which is performed by the terminal transmitting the beam measurement signal and the base station receiving the beam measurement signal.

Thereafter, the base station may end the procedure according to the exemplary embodiment of the present disclosure.

In addition, the uplink beam measurement operation explained above with reference to FIGS. 11 to 13 may equally be applied to downlink beam measurement which changes a reception beam swiftly and changes a transmission beam slowly when the base station and the terminal reverse their roles. That is, FIG. 11 may equally be applied to a case in which the base station transmits signals using a fixed transmission beam Tx Beam m in the downlink beam measurement slot period, and the terminal measures downlink beams by receiving signals while changing reception beams 0-9 in sequence. FIG. 12 may equally be applied to a case in which the terminal receives beam measurement signals transmitted by the serving cell or neighbor cells using a fixed transmission beam, while changing reception beams in sequence in the downlink beam measurement slot period, and measures the downlink beams. FIG. 13 may equally be applied to the downlink beam measurement operation which is performed by the base station transmitting a beam measurement signal in the downlink beam measurement slot period and the terminal changing the reception beam and changing the reception beam order according to a type.

Thereafter, the terminal may end the procedure according to the exemplary embodiment of the present disclosure.

In the beam measurement method of the present disclosure, which changes the reception beam swiftly and changes the transmission beam slowly, as explained in FIGS. 11 and 12, the present disclosure designs the beam measurement signal to repeat continuously in the beam measurement slot period for the same period, for example, an IFFT period, without a cyclic prefix (CP), in order to minimize interference which is caused by time-asynchronous beam measurement signals received from a plurality of transmitters. In this case, the receiver of the present disclosure may measure beams by changing a reception beam on the basis of the CP+IFFT period which is the sum of the CP period and the IFFT period, and receiving the signals of the IFFT period in the CP+IFFT period of each reception beam in the method of Equation 2 or 3. When the beam measurement signals exist in a different frequency or subcarrier in every transmitter, there may be some time periods within the beam measurement slot in which there is no interference even when the beam measurement signals received from the plurality of transmitters are not time-synchronized with one another. However, the beam measurement method which changes the transmission beam swiftly and changes the reception beam slowly requires the CP every time the transmission beam is changed, and thus the CP is added for transmission signals.

Figure 14:
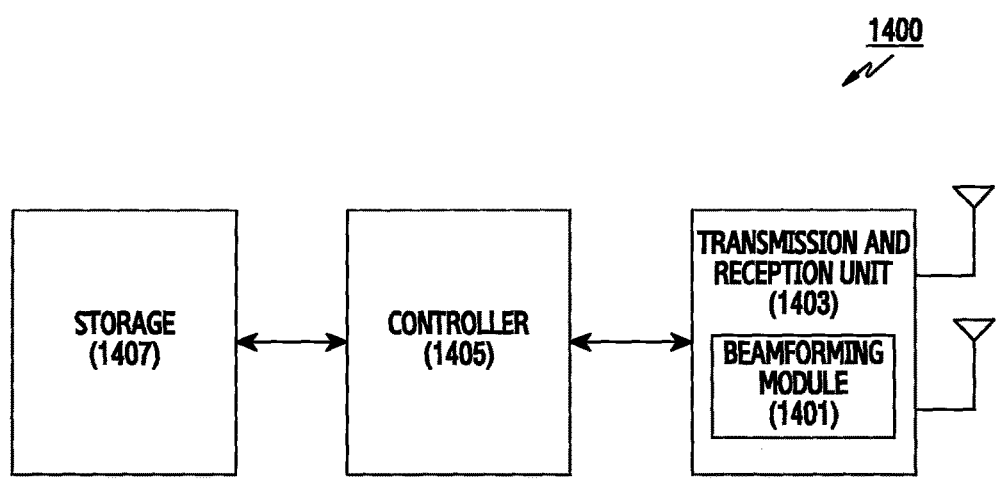
FIG. 14 illustrates a view showing a block configuration of a base station according to an exemplary embodiment of the present disclosure.

FIG. 14 illustrates a view showing a block configuration of a base station according to an exemplary embodiment of the present disclosure.

Referring to FIG. 14, the base station 1400 may include a controller 1405, a transceiver 1403, and a storage 1407.

The controller 1405 controls and process an overall operation for providing a communication service to a terminal within a cell coverage region. In particular, the controller 1405 may control and process a function for transmitting a synchronization signal and common control information through a synchronization signal and common control information slot within a predetermined frame, in order for a terminal located within the cell coverage region of the base station to receive the synchronization signal and the common control information. In this case, the controller 1405 may control a beamforming module 1401 to form transmission beams in an order corresponding to a predetermined type during a synchronization signal and common control information slot period, and transmit the synchronization signal and the common control information according to the order of the formed transmission beams. In addition, the controller 1405 may control and process a function for transmitting the same synchronization signal and common control information two or more times in different transmission beam orders. For example, when transmitting the synchronization signal and the common control information, the controller 1405 may identify at least two pieces of transmission beam type information indicative of different transmission beam orders from the storage 1407, and provide transmission beam order information of the identified transmission beam type to the beamforming module 1401. The transmission beam order information may be indicative of the order of transmission beams to be formed by the beamforming module 1401 based on a transmission beam index.

In addition, the controller 1405 may control and process a function for transmitting a beam measurement reference signal through a beam measurement slot within a predetermined frame, in order for terminals located within the cell coverage region of the base station and terminals in a coverage region of a neighbor cell to receive the beam measurement signal of the base station. In this case, the controller 1405 may control the beamforming module 1401 to form transmission beams in an order corresponding to a predetermined type during a beam measurement slot period, and transmit the beam measurement reference signal according to the order of the formed transmission beams. In addition, the controller 1405 may control and process a function for transmitting the same beam measurement reference signal two or more times in different transmission beam orders. For example, when transmitting the beam measurement reference signal, the controller 1405 may identify at least two pieces of transmission beam type information indicative of the different transmission beam orders from the storage 1407, and provides the transmission beam order information of the identified transmission beam type to the beamforming module 1401. The transmission beam order information may be indicative of the order of transmission beams to be formed by the beamforming module 1401 based on a transmission beam index.

In addition, the controller 1405 may control and process a function for transmitting a beam measurement reference signal through a beam measurement slot within a predetermined frame, in order for the terminals within the cell coverage region of the base station and the terminals of the neighbor cell coverage region to receive the beam measurement signal of the base station. In this case, the controller 1405 may control the beamforming module 1401 to form a fixed transmission beam during a single beam measurement slot period, but change to another beam in another beam measurement slot period to transmit the beam measurement reference signal.

In addition, the controller 1405 may control and process an overall operation for receiving uplink beam measurement signals which are transmitted by the terminals within the cell coverage region of the base station 1400 and the terminals of the neighbor cell coverage region. In this case, the controller 1405 may control the beamforming module 1401 to form reception beams in an order corresponding to a predetermined type during an uplink beam measurement slot period, and receive a beam measurement reference signal according to the order of the formed reception beams. The controller 1405 may receive the beam measurement reference signal and measure beams based on Equation 3. In addition, the controller 1405 may control and process a function for receiving the same beam measurement reference signal two or more times in different reception beam orders. For example, in receiving the beam measurement reference signal, the controller 1405 may identify at least two pieces of reception beam type information indicative of different reception beam orders, and provide the reception beam order information of the identified reception beam type to the beamforming module 1401. The reception beam order information may be indicative of the order of reception beams to be formed by the beamforming module 1401 based on a reception beam index.

In addition, the controller 1405 may control and process an overall operation for receiving uplink beam measurement signals which are transmitted by the terminals within the cell coverage region of the base station 1400 and the terminals of the neighbor cell coverage region. In this case, the controller 1405 may control the beamforming module 1401 to receive the beam measurement reference signals by using a fixed reception beam during a single uplink beam measurement slot period, and change to another reception beam during another uplink beam measurement slot period to receive signals. The controller 1405 may receive the beam measurement reference signals and measure beams based on Equation 3. In addition, the controller 1405 may control and process a function for receiving a signal which transmits the same beam measurement reference signal two or more times in different transmission beam orders.

The transceiver 1403 may control and process a function for transmitting and receiving signals to and from a terminal through an antenna under the control of the controller 1405. For example, the transceiver 1403 may perform a function for receiving a transmission signal from the controller 1405 and processing the transmission signal to transmit through antenna beams formed by the beamforming module 1401. In addition, the transceiver 1403 may perform a function for processing to receive a signal received through antenna beams formed by the beamforming module 1401. Herein, the transceiver 1403 is configured as a single module, but may be configured as a transmission unit and a reception unit, separately, according to a design method, and an antenna for transmitting and an antenna for receiving may be connected to the transmission unit and the reception unit, respectively.

The beamforming module 1401 controls an antenna to form transmission or reception beams according to transmission or reception beam order information provided by the controller 1405. For example, when a plurality of antennas connected to the transceiver 1403 are formed of directional antennas of a horn type which have different antenna directions and beam areas, the beamforming module 1401 may control a switch to connect at least one of the directional antennas of the horn type according to the transmission or reception beam order information. In another example, when the plurality of antennas connected to the transceiver 1403 are formed of array antennas, the beamforming module 1401 may generate a weight vector for changing phases of the array antennas according to the transmission or reception beam order information, and change the phases of the array antennas based on the generated weight vector.

The storage 1407 stores various data and programs necessary for the operations of the base station. The storage 1407 may store information on the synchronization signal and common control information slot period within the frame, and information on the beam measurement slot period. In addition, the storage 1407 may store information on at least two transmission or reception beam types indicative of different transmission or reception beam orders. For example, when the base station uses 10 transmission or reception beams, the order of the first type may be 0, 1, 2, 3, 4, 5, 6, 7, 8, 9 and the order of the second type may be the reverse order of the first type, 9, 8, 7, 6, 5, 4, 3, 2, 1, 0, or the reversed order of one half and the other of the first type like 5, 6, 7, 8, 9, 0, 1, 2, 3, 4.

In addition, the storage 1407 may store an uplink frame synchronization error value Time_Advance [u] regarding the terminals of the base station or the terminals of the neighbor cell. The storage 1407 may store the beam measurement reference signal received from the terminals in the uplink beam measurement slot period, and reception beam order information on the received beam measurement reference signal. In addition, the storage 1407 may store the beam measurement value provided by the controller 1405.

Figure 15:
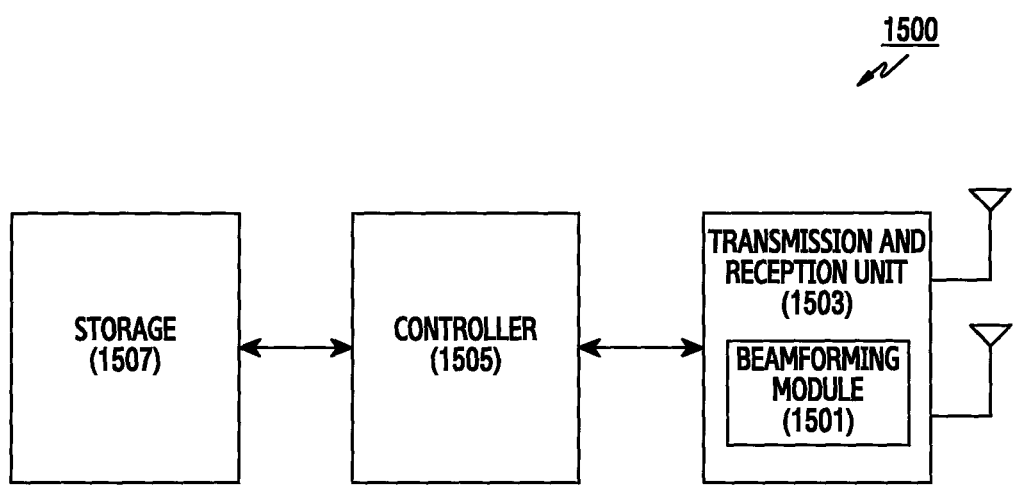
FIG. 15 illustrates a view showing a block configuration of a terminal according to an exemplary embodiment of the present disclosure.

FIG. 15 illustrates a view showing a block configuration of a terminal according to an exemplary embodiment of the present disclosure.

Referring to FIG. 15, the terminal 1500 may include a controller 1505, a transceiver 1503, and a storage 1507.

The controller 1505 controls and processes an overall operation of connecting to the base station 1400 and receiving a service. In particular, the controller 1505 controls and processes a function for searching for a neighbor cell during communication with a serving cell, and measuring beams of the searched neighbor cell. For example, the controller 1505 may control a function of searching for a neighbor cell, while acquiring frame synchronization for the serving cell in a predetermined synchronization signal and common control information slot within an even-numbered frame. In this case, the controller 1505 may acquire the frame synchronization for the serving cell and search for the neighbor cell by using a reception beam Brx_Frame, which is selected as a best reception beam for the serving cell. In addition, the controller 1505 may control a function of not acquiring frame synchronization for the serving cell in a predetermined synchronization signal and common control information slot within an odd-numbered frame, and searching for the neighbor cells while changing the reception beam. In this case, since the frame time period of the neighbor cell does not exactly match the frame time period of the serving cell, the terminal does not receive a synchronization signal and common control information from the neighbor cell in a synchronization signal and common control information slot period within a frame period synchronized with the serving cell, and thus the controller 1505 may not search for a neighbor cell. Accordingly, as described above in FIG. 4, the controller 1505 may control to receive the synchronization signal and the common control information by repeating the same reception beam two or more times. The controller 1505 may search for the neighbor cell in the synchronization signal and common control information slot period and identify the number of the searched neighbor cell, and determine a frame synchronization time of the searched neighbor base station and/or a time shift value TS (c;Brx_Frame) between the frame of the searched neighbor base station and the frame of the serving base station, based on Equation 1. The controller 1505 may acquire time information to receive a beam measurement slot of the neighbor base station based on the determined frame synchronization time of the neighbor base station and/or the time shift value between the frame of the neighbor base station and the frame of the serving base station.

In addition, the controller 1505 may control a function for receiving a beam measurement reference signal from the searched neighbor cell, while changing a reception beam for a predetermined beam measurement slot within a frame to measure beams of the searched neighbor cell. In this case, since the frame time period of the neighbor cell does not exactly match the frame time period of the serving cell, the controller 1505 does not receive a beam measurement reference signal from the neighbor cell in a beam measurement slot period within a frame period synchronized with the serving cell. Accordingly, as shown in FIGS. 7A to 7C, the controller 1505 may control to receive the beam measurement reference signal by repeating the same reception beam two or more times. The controller 1505 may receive the beam measurement reference signal of the neighbor cell in the beam measurement slot period, and measure the transmission beam of the neighbor cell for each of the reception beams.

In addition, the controller 1505 may control a function for transmitting an uplink beam measurement reference signal in a predetermined uplink beam measurement slot within a frame in order for the serving cell and the neighbor cell to perform uplink beam measurement. In this case, the neighbor cell base station may not receive the uplink beam measurement reference signal. Accordingly, the controller 1505 may control to transmit the beam measurement reference signal by repeating the same transmission beams two or more times.

The transceiver 1503 may control and process a function for transmitting and receiving signals to and from the base station 1400 through an antenna under the control of the controller 1505. For example, the transceiver 1503 performs a function for receiving a transmission signal from the controller 1505 and processing the transmission signal to transmit through antenna beams formed by the beamforming module 1501. In addition, the transceiver 1503 performs a function for processing to receive a signal received through the antenna beams formed by the beamforming module 1501. Herein, the transceiver 1503 is configured as a single module, but may be configured as a transmission unit and a reception unit, separately, according to a design method, and an antenna for transmitting and an antenna for receiving may be connected to the transmission unit and the reception unit, respectively.

The beamforming module 1501 controls an antenna to form reception or transmission beams according to reception or transmission beam order information provided by the controller 1505. For example, when a plurality of antennas connected to the transceiver 1503 are formed of directional antennas of a horn type which have different antenna directions and beam areas, the beamforming module 1501 may control a switch to connect at least one of the directional antennas of the horn type according to the reception or transmission beam order information provided by the controller 1505. In another example, when the plurality of antennas connected to the transceiver 1503 are formed of array antennas, the beamforming module 1501 may generate a weight vector for changing phases of the array antennas according to the reception or transmission beam order information provided by the controller 1505, and change the phases of the array antennas based on the generated weight vector. Herein, the reception or transmission beam information may include a reception or transmission beam index.

The storage 1507 stores various data and programs necessary for the operations of the terminal. The storage 1507 may store information on the synchronization signal and common control information slot period within the frame, and information on the beam measurement slot period. In addition, the storage 1507 may store signals received from the neighbor base station in the synchronization signal and common control information slot period, and transmission beam order information regarding the received signals. In addition, the storage 1507 may store beam measurement slot reception time information of the neighbor base station provided by the controller 1505. In addition, the storage 1507 may store the beam measurement reference signal received from the neighbor base station in the beam measurement slot period, and transmission beam order information regarding the received beam measurement reference signal. In addition, the storage 1507 may store the beam measurement value provided by the controller 1505.

The exemplary embodiments of the present disclosure and all of the functional operations explained in the present specification may be implemented by computer software, firmware, or hardware including the structure disclosed in the present specification and equivalent structures thereto, or a combination of one or more of them. In addition, the exemplary embodiments of the present disclosure described in the present specification may be implemented by one or more modules of computer program commands which are executed by one or more computer program products, that is, data processing devices, or are encoded on a computer readable medium to control the operations of the devices.

The computer readable medium may be a machine readable storage medium, a machine readable storage substrate, a memory device, a configuration of material which influences a machine readable soundwave stream, or a combination of one or more of them. The term "data processing device" includes a programmable processor, a computer, or all apparatuses, devices, and machines for processing data, which include a multiprocessor or a computer. The apparatus may include a code which is added to hardware to generate an execution environment for a corresponding computer program, for example, a code configuring processor firmware, a protocol stack, a database management system, an operating system, or a combination of one or more of them.

While specific embodiments have been described in the detailed descriptions of the present disclosure, various changes can be made within a limit without departing from the scope of the present disclosure. Therefore, the scope of the present disclosure should not be limited to and defined by the above-described exemplary embodiments, and should be defined not only by the appended claims but also by the equivalents to the scopes of the claims.

What is claimed is:

1. A method for operating a terminal, the method comprising:
   receiving a synchronization signal for a serving cell in a reference slot within a frame;
   identifying whether a frame number of the frame is even or odd;
   when the identified frame number is odd,
      determining to search a neighbor cell, in the reference slot within the frame,
      receiving, by using a reception beam, a signal for searching the neighbor cell in the reference slot within a first frame, wherein the signal for searching the neighbor cell is transmitted from the neighbor cell through at least one of a plurality of beams in a first beam order,
      receiving, by using the reception beam, the signal for searching the neighbor cell in the reference slot within a second frame, wherein the signal for searching the neighbor cell is transmitted from the neighbor cell through at least one other of the plurality of beams in a second beam order different from the first beam order,
      identifying information related to a synchronization time of the neighbor cell, based on the signal received in at least one of the first frame or the second frame, and
      receiving, from the neighbor cell, a reference signal for a beam measurement by using the identified information, and
   when the identified frame number is even,
      acquiring, by a pre-set reception beam for the serving cell, a frame synchronization for the serving cell in the reference slot within the frame,
   wherein the reference slot is a slot for receiving the synchronization signal from the serving cell for the terminal.

2. The method of claim 1, further comprising:
receiving, by using another reception beam, the signal for searching the neighbor cell in the reference slot within a third frame, wherein the signal is transmitted from the neighbor cell through the at least one of the plurality of beams in the first beam order; and
receiving, by using the another reception beam, the signal for searching the neighbor cell in the reference slot within a fourth frame, wherein the signal is transmitted from the neighbor cell through the at least one other of the plurality of beams in the second beam order.

3. The method of claim 1, wherein the information related to the synchronization time of the neighbor cell comprises at least one of a frame synchronization time for the neighbor cell or a synchronization time shift between a frame of the neighbor cell and a frame of the serving cell.

4. The method of claim 1, wherein the receiving, from the neighbor cell, the reference signal for the beam measurement by using the identified information comprises:
receiving, by using a measurement reception beam, the reference signal for the beam measurement in a measurement slot within a first subframe of each frame, wherein the reference signal is transmitted from the neighbor cell through at least one of the plurality of beams in a third beam order; and
receiving, by using the measurement reception beam, the reference signal for the beam measurement in the measurement slot within a second subframe of the each frame, wherein the reference signal is transmitted from the neighbor cell through at least one other of the plurality of beams in a fourth beam order.

5. The method of claim 1, further comprising:
searching the neighbor cell by using the pre-set reception beam for the serving cell, while acquiring the frame synchronization for the serving cell.

6. An apparatus of a terminal comprising:
a transceiver; and
at least one processor configured to:
receiving a synchronization signal for a serving cell in a reference slot within a frame,
identifying whether a frame number of the frame is even or odd,
when the identified frame number is odd,
  determining to search a neighbor cell, in the reference slot within the frame,
  receive, by using a reception beam, a signal for searching the neighbor cell in the reference slot within a first frame, wherein the signal for searching the neighbor cell is transmitted from the neighbor cell through at least one of a plurality of beams in a first beam order,
  receive, by using the reception beam, the signal for searching the neighbor cell in the reference slot within a second frame, wherein the signal for searching the neighbor cell is transmitted from the neighbor cell through at least one other of the plurality of beams in a second beam order different from the first beam order,
  identify information related to a synchronization time of the neighbor cell, based on the signal received in at least one of the first frame or the second frame, and
  receive, from the neighbor cell, a reference signal for a beam measurement by using the identified information, and
when the identified frame number is even,
  acquiring, by a pre-set reception beam for the serving cell, a frame synchronization for the serving cell in the reference slot within the frame,
wherein the reference slot is a slot for receiving the synchronization signal from the serving cell for the terminal.

7. The method of claim 1, wherein the acquiring the frame synchronization for the serving cell comprises receiving, from the serving cell, the synchronization signal and common control information, by using the pre-set reception beam for the serving cell.

8. The apparatus of claim 6, wherein the at least one processor is further configured to:
receive, by using another reception beam, the signal for searching the neighbor cell in the reference slot within a third frame, wherein the signal is transmitted from the neighbor cell through the at least one of the plurality of beams in the first beam order, and
receive, by using the another reception beam, the signal for searching the neighbor cell in the reference slot within a fourth frame, wherein the signal is transmitted from the neighbor cell through the at least one other of the plurality of beams in the second beam order.

9. The apparatus of claim 6, wherein the information related to the synchronization time of the neighbor cell comprises at least one of a frame synchronization time for the neighbor cell or a synchronization time shift between a frame of the neighbor cell and a frame of the serving cell.

10. The apparatus of claim 6, wherein the at least one processor, in order to receive the reference signal for the beam measurement, is configured to:
receive, by using a measurement reception beam, the reference signal for the beam measurement in a measurement slot within a first subframe of each frame, wherein the reference signal is transmitted from the neighbor cell through at least one of the plurality of beams in the third beam order; and
receiving, by using the measurement reception beam, the reference signal for the beam measurement in the measurement slot within a second subframe of the each frame, wherein the reference signal is transmitted from the neighbor cell through at least one other of the plurality of beams in a fourth beam order.

11. The apparatus of claim 6, wherein the at least one processor is configured to search the neighbor cell by using the pre-set reception beam for the serving cell, while acquiring the frame synchronization for the serving cell.

12. The apparatus of claim 6, wherein the at least one processor, in order to acquire the frame synchronization for the serving cell, is configured to:
receive, from the serving cell, the synchronization signal and common control information, by using the pre-set reception beam for the serving cell.

13. The method of claim 4, further comprising:
identifying a type indicating an order of the plurality of beams in which the reference signal is transmitted based on a subframe number;
identifying a transmission beam number from a number of a beam of the plurality of beams in which the reference signal is transmitted, according to the type; and
measuring the reference signal according to each transmission beam number.

14. The apparatus of claim 10, wherein the at least one processor is further configured to:
- identify a type indicating an order of the plurality of beams in which the reference signal is transmitted based on a subframe number;
- identify a transmission beam number from a number of a beam of the plurality of beams in which the reference signal is transmitted, according to the type; and
- measure the reference signal according to each transmission beam number.

* * * * *